US012705852B2

(12) United States Patent
Tomita et al.

(10) Patent No.: US 12,705,852 B2
(45) Date of Patent: Aug. 11, 2026

(54) PRODUCT DETECTION DEVICE, PRODUCT DETECTION SYSTEM, PRODUCT DETECTION METHOD, AND RECORDING MEDIUM

(71) Applicant: NEC Corporation, Tokyo (JP)

(72) Inventors: Rina Tomita, Tokyo (JP); Yuji Tahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 551 days.

(21) Appl. No.: 18/017,324

(22) PCT Filed: Jul. 31, 2020

(86) PCT No.: PCT/JP2020/029427
§ 371 (c)(1),
(2) Date: Jan. 20, 2023

(87) PCT Pub. No.: WO2022/024341
PCT Pub. Date: Feb. 3, 2022

(65) Prior Publication Data
US 2023/0290105 A1 Sep. 14, 2023

(51) Int. Cl.
*G06V 10/25* (2022.01)
*G06T 3/40* (2024.01)
(Continued)

(52) U.S. Cl.
CPC ................ *G06V 10/25* (2022.01); *G06T 3/40* (2013.01); *G06T 7/60* (2013.01); *G06V 10/28* (2022.01); *G06V 2201/07* (2022.01)

(58) Field of Classification Search
CPC ........ G06V 10/28; G06V 20/52; G06V 20/64; G06V 10/25; G06V 10/764; G06V 20/68;
(Continued)

(56) References Cited

U.S. PATENT DOCUMENTS

2018/0089613 A1* 3/2018 Chen .......................... G06T 7/90
2018/0122062 A1* 5/2018 Takenaka ............. H04N 5/2621
(Continued)

FOREIGN PATENT DOCUMENTS

JP 2010-517148 A 5/2010
JP 2016-058105 A 4/2016
JP 2016-207164 A 12/2016

OTHER PUBLICATIONS

H. Sun, K. Hanata, H. Sato, I. Tsuchitani and T. Akashi, "Segmentation based Non-learning Product Detection for Product Recognition on Store Shelves," 2019 Nicograph International (NicoInt), Yangling, China, 2019, pp. 9-16, doi: 10.1109/NICOInt.2019.00009. (Year: 2019).*
(Continued)

*Primary Examiner* — Sumati Lefkowitz
*Assistant Examiner* — Aaron Joseph Sorrin
(74) *Attorney, Agent, or Firm* — Sughrue Mion, PLLC

(57) ABSTRACT

A product detection device is provided with: an image acquisition unit; a binarization unit; and a detection unit. The image acquisition unit acquires an image of shelves for displaying products. The binarization unit binarizes a region in the image into a product region where products are imaged and a non-product region where things other than the products are imaged. The detection unit detects the display state of products displayed on the shelves in accordance with the width of the binarized product region and the width of a gap region adjacent to the products.

17 Claims, 23 Drawing Sheets

(51) Int. Cl.
*G06T 7/60* (2017.01)
*G06V 10/28* (2022.01)

(58) Field of Classification Search
CPC ........... G06T 7/194; G06T 2207/30128; G06T 7/0008; G06Q 10/087; G06Q 20/203; G06Q 30/0639; G06Q 30/06
See application file for complete search history.

(56) References Cited

U.S. PATENT DOCUMENTS

| | | | | |
|---|---|---|---|---|
| 2018/0260767 | A1* | 9/2018 | Findlay | G06Q 10/087 |
| 2019/0149725 | A1* | 5/2019 | Adato | H04N 1/00 348/158 |

OTHER PUBLICATIONS

International Search Report for PCT Application No. PCT/JP2020/029427, mailed on Oct. 27, 2020.
English translation of Written opinion for PCT Application No. PCT/JP2020/029427, mailed on Oct. 27, 2020.

* cited by examiner

| SHELF A | SHELF B | SHELF C |
| --- | --- | --- |
| HOT SHOW CASE | NORMAL TEMPERATURE DISPLAY SHELF | REFRIGERATING SHELF |
| WITHOUT PARTITION | WITHOUT PARTITION | WITH PARTITION |
| IMAGE A  | IMAGE B  | IMAGE C  |

200
1a
PRODUCT DETECTION DEVICE
3
CAMERA
11
IMAGE ACQUISITION UNIT
12
BINARIZATION UNIT
31
WEIGHT STORAGE UNIT
32
WEIGHTING UNIT
13
GENERATION UNIT
15
SHELF INFORMATION STORAGE UNIT
14
DETECTION UNIT
17
NOTIFICATION UNIT
2
STORE TERMINAL
16
MODEL STORAGE UNIT

START
ACQUIRE IMAGE OF PRODUCT SHELF
S201
BINARIZE IMAGE INTO PRODUCT REGION AND NON-PRODUCT REGION
S202
WEIGHT PIXEL
S203
CALCULATE RATIO BETWEEN PRODUCT REGION AND ADJACENT GAP IN BINARIZED IMAGE
S204
DETECT DISPLAY STATE OF PRODUCT
S205
ABNORMAL?
S206
NO
YES
MAKE NOTIFICATION TO TERMINAL OF STORE CLERK
S207
END

PRODUCT DETECTION DEVICE, PRODUCT DETECTION SYSTEM, PRODUCT DETECTION METHOD, AND RECORDING MEDIUM

This application is a National Stage Entry of PCT/JP2020/029427 filed on Jul. 31, 2020, the contents of all of which are incorporated herein by reference, in their entirety.

TECHNICAL FIELD

The present disclosure relates to a product detection device, a product detection system, a product detection method, and a product detection program.

BACKGROUND ART

Currently, the problem of difficulties in securing store employees due to labor shortage is becoming more serious. In such an environment, it is desired to develop a technique for saving labor such as product inventory management and replenishment work of products to a display shelf and reducing the burden on employees.

In a store, there is known a method of detecting stockout and display disturbance of products displayed on a product shelf or the like by using a learned model (hereinafter, also referred to as a model) obtained by learning an image of a displayed product.

PTL 1 discloses a technique of capturing an image of a state of a product shelf and superimposing and displaying images color-coded according to a display state in such a way that a display shortage state can be recognized. PTL 2 describes a technique for making notification to replenish products when there are few products on the product shelf and performing reordering for inventory storage.

CITATION LIST

Patent Literature

[PTL 1] JP 2016-58105 A
[PTL 2] JP 2010-517148 A

SUMMARY OF INVENTION

Technical Problem

However, PTL 1 and PTL 2 do not disclose a technique for improving detection accuracy of product stockout or display disturbance in each store. It is necessary to set a detection condition for each store when stockout and display disturbance of products displayed on the product shelf are detected. For example, since the product shelves are different for respective stores, an interval (gap) between products displayed on the product shelves may be different. Therefore, when this interval is not considered, false recognition is likely to occur in the detection of the product in each store, and the detection accuracy is degraded. As a result, unnecessary display anomaly notification is generated to lower the work efficiency of a store clerk.

In order to solve the above problem, an object of the present disclosure is to provide a technique for improving detection accuracy of a product display state in a store, and improving efficiency of replenishment work of products to a display shelf.

Solution to Problem

A product detection device according to an aspect of the present disclosure includes an image acquisition unit that acquires an image of a shelf on which a product is displayed, a binarization unit that binarizes a region in the image into a product region in which the product appears and a non-product region in which a thing other than the product appears, and a detection unit that detects a state of display of the product displayed on the shelf according to a width of the binarized product region and a width of a gap region adjacent to the product.

A product detection system according to an aspect of the present disclosure includes the product detection device described above, a camera that captures the image to transmit the captured image to the product detection device, and a terminal that receives a notification related to the detection from the product detection device.

A product detection method according to an aspect of the present disclosure includes acquiring an image of a shelf on which a product is displayed, binarizing a region in the image into a product region in which the product appears and a non-product region in which a thing other than the product appears, and detecting a state of display of the product displayed on the shelf according to a width of the binarized product region and a width of a gap region adjacent to the product.

A product detection program according to an aspect of the present disclosure causes a computer to execute acquiring an image of a shelf on which a product is displayed, binarizing a region in the image into a product region in which the product appears and a non-product region in which a thing other than the product appears, and detecting a state of display of the product displayed on the shelf according to a width of the binarized product region and a width of a gap region adjacent to the product.

The program may be stored in a non-transitory computer-readable recording medium.

Any combinations of the above components and modifications of the expressions of the present disclosure among methods, devices, systems, recording media, computer programs, and the like are also effective as aspects of the present disclosure.

Various components of the present disclosure do not necessarily need to be individually independent. A plurality of components may be formed as one member, one component may be formed of a plurality of members, a certain component may be part of another component, part of a certain component may overlap with part of another component, and the like.

Although the method and the computer program of the present disclosure describe a plurality of procedures in order, the order of description does not limit the order of executing the plurality of procedures. Therefore, when the method and the computer program of the present disclosure are implemented, the order of the plurality of procedures can be changed within a range in which there is no problem in content.

Furthermore, the plurality of procedures of the method and the computer program of the present disclosure are not limited to being executed at individually different timings. Therefore, another procedure may occur during execution of a certain procedure. The execution timing of a certain procedure and the execution timing of another procedure may partially or entirely overlap with each other.

Advantageous Effects of Invention

An effect of the present disclosure is to provide a technique for improving detection accuracy of a product display state in a store and improving efficiency of replenishment work of products to a display shelf.

EXAMPLE EMBODIMENT

Figure 1:
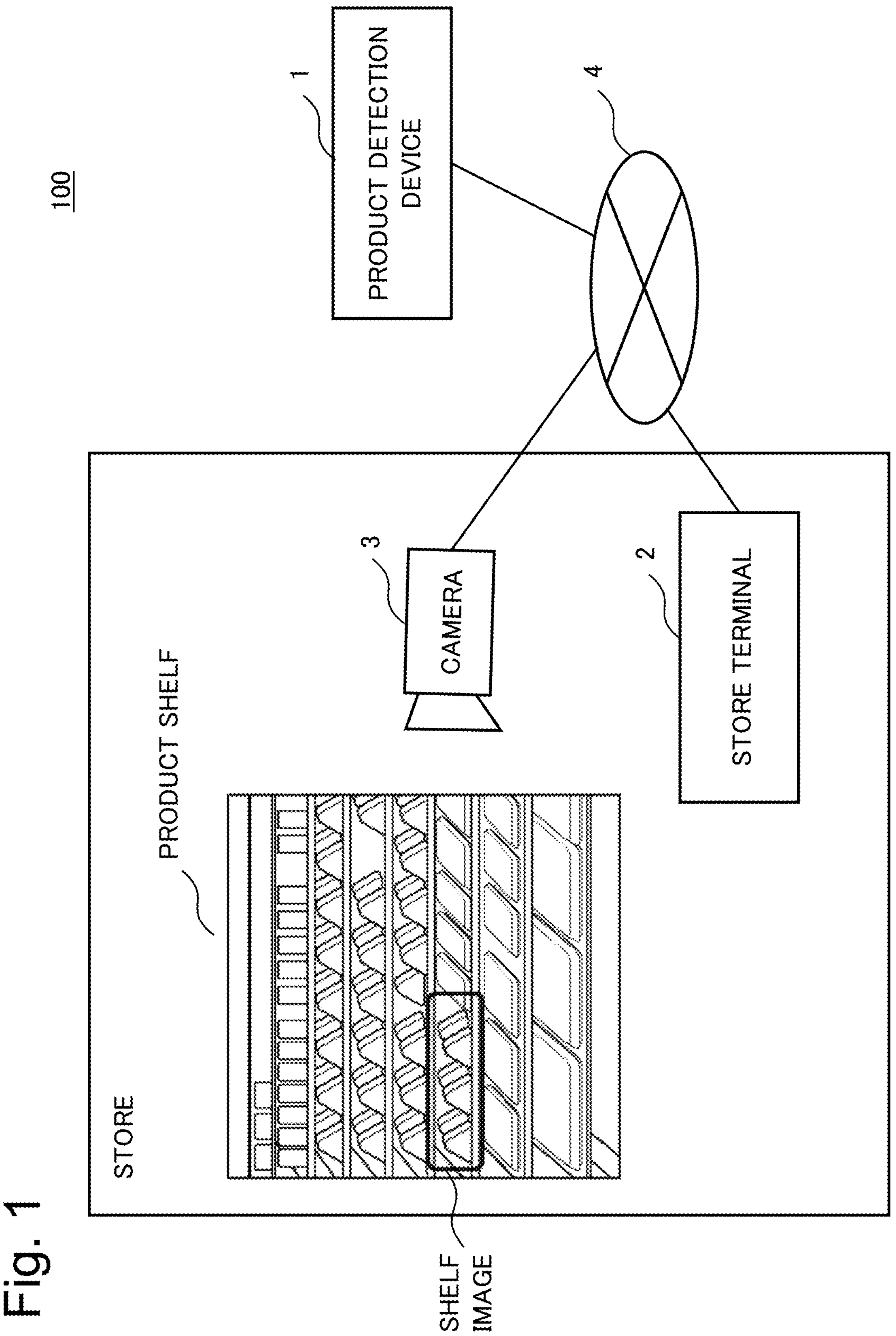
FIG. 1 is a diagram conceptually illustrating a configuration example of a product detection system according to the first example embodiment of the present disclosure.

Hereinafter, example embodiments of the present disclosure will be described with reference to the drawings. In all the drawings, the same components are denoted by the same reference numerals, and the description thereof will be omitted as appropriate. In the following drawings, configurations of portions not involved in the essence of the present disclosure are omitted and not illustrated.

In the example embodiment, "acquiring" includes at least one of a case where the host device goes to another device or a recording medium to acquire data or information (active acquisition), and a case where data or information output from another device is input to the host device (passive acquisition). Examples of the active acquisition include requesting or inquiring another device and receiving a reply thereto, and accessing and reading another device or a recording medium. Examples of passive acquisition include receiving information to be distributed (Alternatively, transmitted, push notified, and the like). Further, "acquiring" may include selecting and acquiring data or information from among received data or information, or selecting and receiving distributed data or information.

First Example Embodiment (Product Detection System)

FIG. 1 is a block diagram conceptually illustrating a configuration example of a product detection system 100 according to the first example embodiment of the present disclosure. The product detection system 100 includes a product detection device 1, a store terminal 2, and a camera 3. Camera 3 and store terminal 2 are connected to product detection device 1 via a communication network 4 such as the Internet or an intranet. Note that the product detection device 1 may be provided in a store and connected to the camera 3 by a wired cable or the like.

Camera 3 is a camera that is provided for each store and captures an image of a product shelf. The camera 3 may be a camera including a fisheye lens and imaging a wide area. The camera 3 may be a camera including a mechanism (for example, a mechanism that moves on a rail installed on a ceiling) that moves in the store. There may be a plurality of cameras 3, and each camera 3 captures a shelf image (see FIG. 1) that is a section of the product shelf.

The image of the product shelf captured by the camera is transmitted to the product detection device 1, and the product detection device 1 detects product shortage, product stockout, or display disturbance. When product shortage, product stockout, or display disturbance is detected, the product detection device 1 notifies the store terminal 2 of a detection result. The store terminal 2 presents to a store clerk information for correcting product shortage, product stockout, or display disturbance.

(Product Detection Device)

Figure 2:
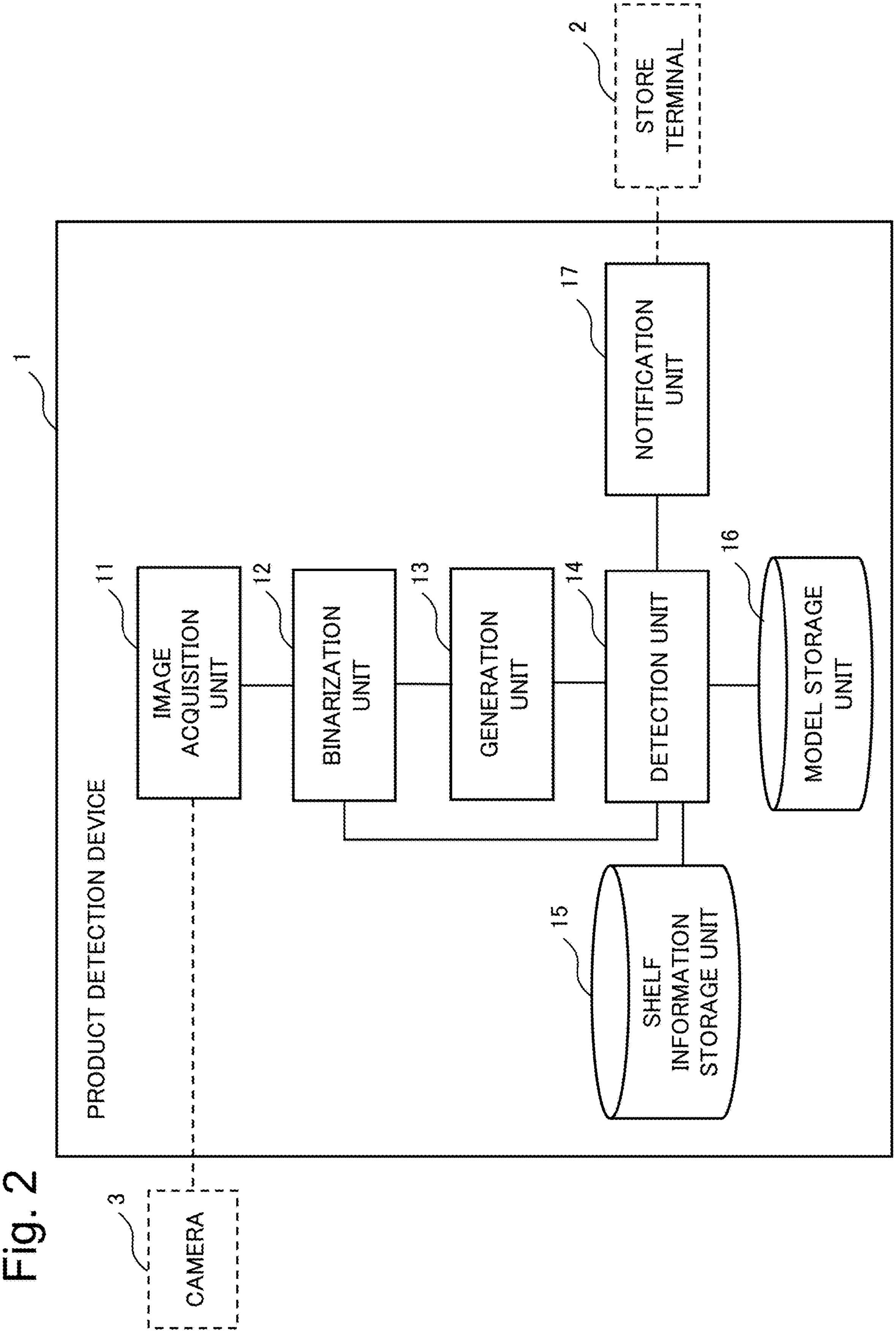
FIG. 2 is a diagram illustrating an internal configuration example of a product detection device according to the first example embodiment of the present disclosure.

Next, an example of an internal structure of the product detection device 1 will be described with reference to FIG. 2.

The product detection device 1 includes an image acquisition unit 11, a binarization unit 12, a generation unit 13, a shelf information storage unit 15, a model storage unit 16, a detection unit 14, and a notification unit 17.

Figure 3:
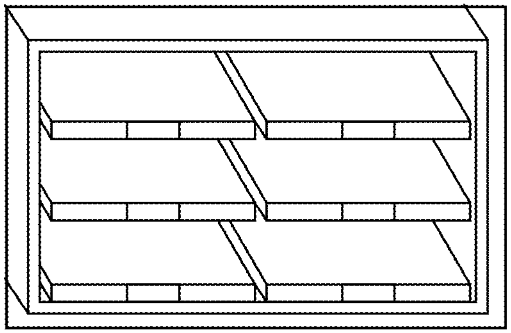
FIG. 3 is a diagram illustrating an example of a data structure of shelf information.
Figure 3:
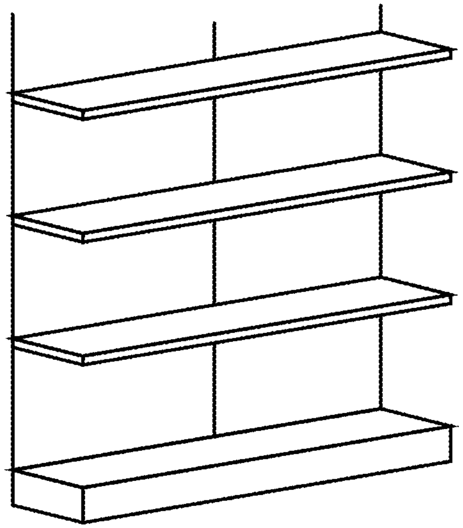
Figure 3:
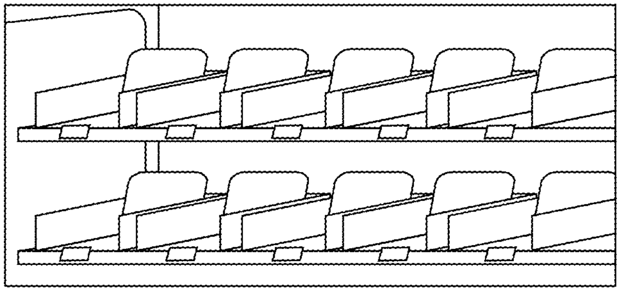

The shelf information storage unit 15 stores shelf information. The shelf information is obtained by associating an image of a shelf acquired in advance from the camera 3 with information about the shelf. For example, as illustrated in FIG. 3, the shelf information includes a shelf name, a shelf type, the presence or absence of a partition, and a shelf image.

The shelf name is a name for identifying a shelf. It may be a shelf identifier (ID). In FIG. 3, the shelf names are a shelf A, a shelf B, and a shelf C. The shelf type is information indicating a type of a shelf. Examples thereof include a hot showcase, a normal temperature display shelf, and a refrigerating shelf. The presence or absence of a partition is information indicating whether there is a partition mechanism (for example, a partition, a rail, or the like) for partitioning products or there is no partition mechanism (only a flat face). The shelf image is an image of a display shelf.

The model storage unit 16 stores a model learned, for each shelf shape, for detecting a display state of a product displayed on the shelf. A plurality of types of models may be stored.

The image acquisition unit 11 acquires a shelf image, which is a section of a product shelf on which a product is displayed, captured by the camera 3. A product and a background (such as a shelf) appear in the image. Note that, in order to detect the size of the product from the shelf image after imaging, the shelf image is required to be captured by a method capable of detecting the size. The image acquisition unit 11 delivers the acquired image to the binarization unit 12.

The binarization unit 12 binarizes a region in the shelf image based on whether the region is a product region in which the product appears or the region is a non-product region (for example, a shelf base face, a background) in which a thing other than the product appears. Binarization based on whether the region is a product region or a non-product region can be achieved using a general two-dimensional image processing technology (for example, a semantic segmentation technique). The semantic segmentation technique is a type of the deep learning algorithm that associates labels and categories with all pixels in an image, and separates an object and a background by recognizing a group of pixels forming a characteristic category.

Figure 4:
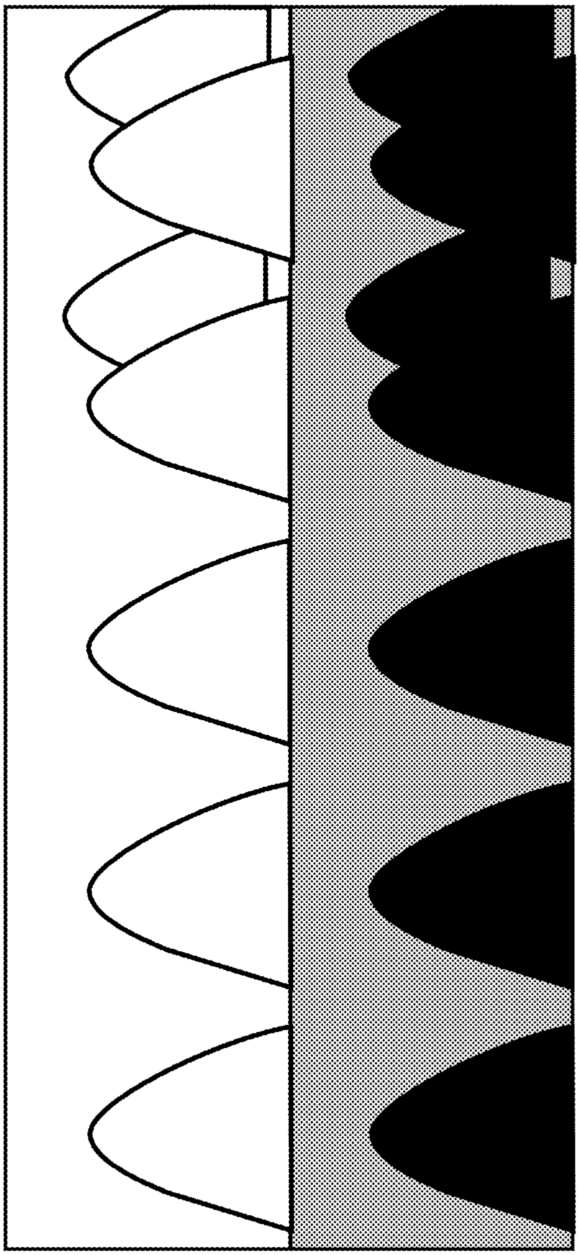
FIG. 4 is a diagram illustrating an example of a binarized image (normal).

The binarized image will be described. In FIG. 4, the upper stage illustrates an image of a product rice ball, and the lower stage illustrates an image obtained by binarizing the image (hereinafter, also referred to as a binarized image). In FIG. 4, the product rice balls are normally displayed. Note that, for example, as illustrated in the lower stage of FIG. 4, the binarization unit 12 converts the product into black and the background into gray, and shows the product on the image.

Figure 5:
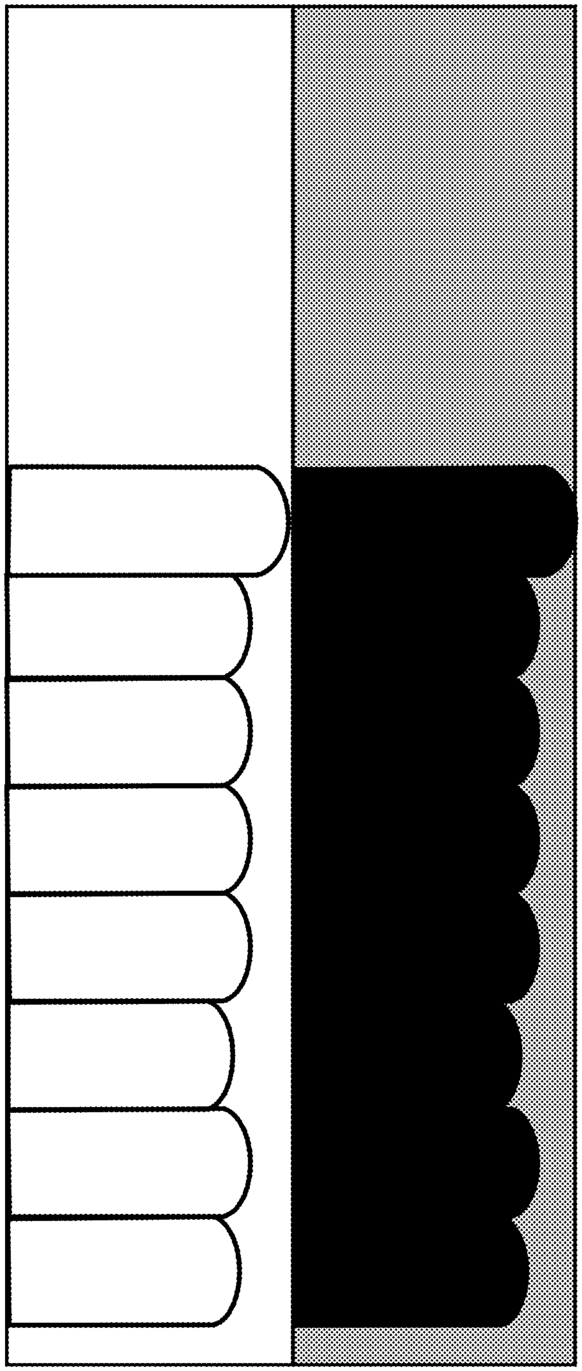
FIG. 5 is a diagram illustrating an example of a binarized image (anomaly).

In FIG. 5, the upper stage illustrates an image of product PET bottles, and the lower stage illustrates a binarized image of the image. In FIG. 5, a display anomaly (product shortage) is seen on the right side of the image.

Figure 6:
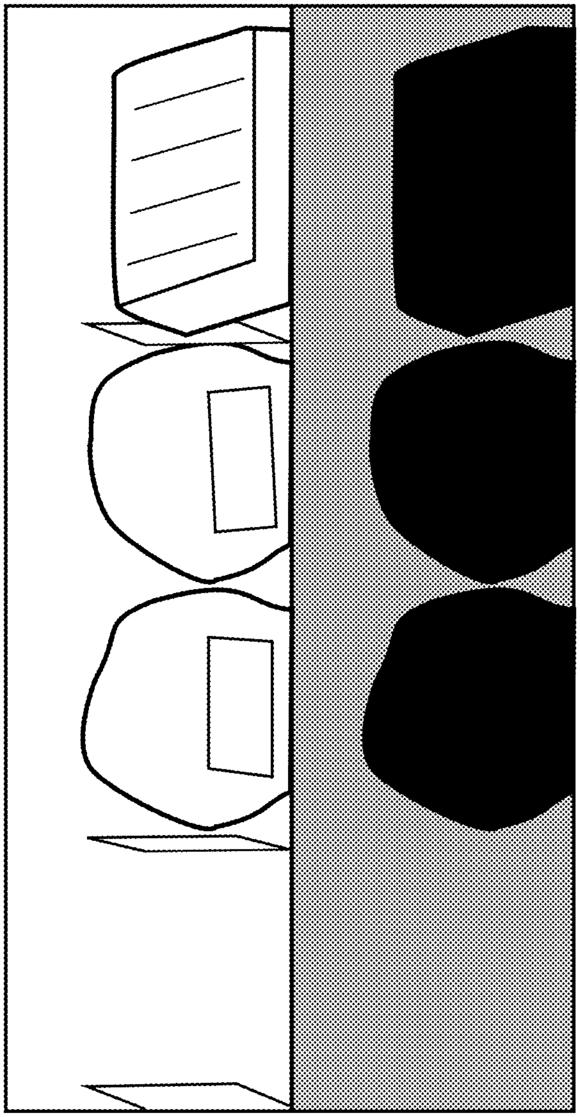
FIG. 6 is a diagram illustrating an example of a binarized image (exception normal).

In FIG. 6, the upper stage illustrates an image of product sandwiches, and the lower stage illustrates a binarized image of the image. In FIG. 6, at a glance, a display anomaly (product shortage) is seen on the left side of the image, but there is a shelf partition mechanism on the left side, and the product cannot be moved. Therefore, the display state is exceptionally normal. The exceptional display process will be described later.

Figure 7:
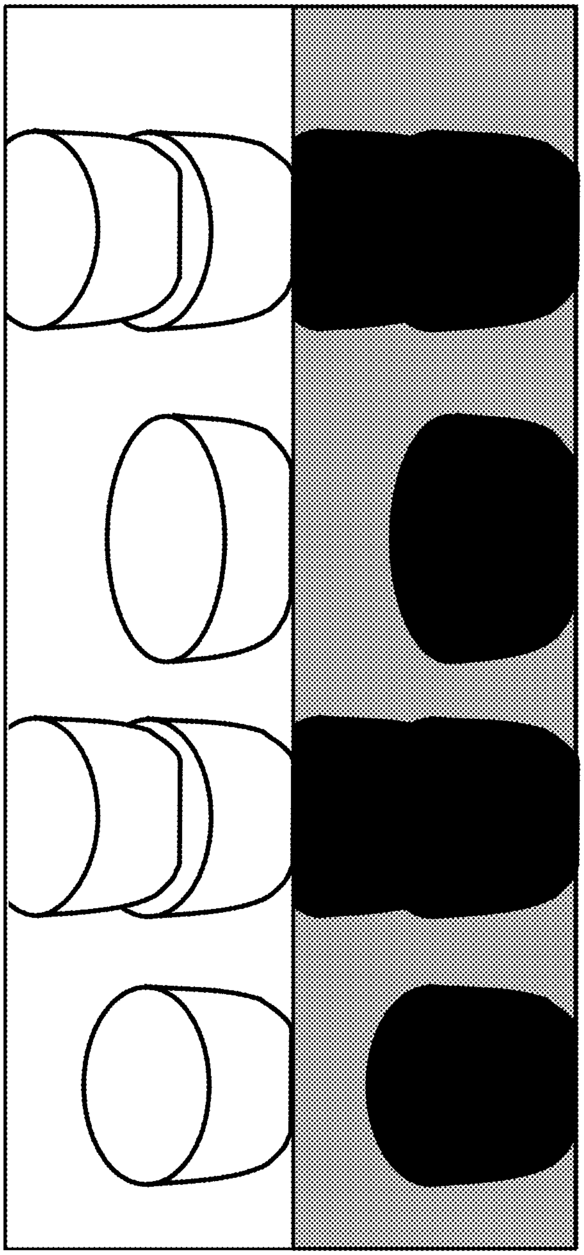
FIG. 7 is a diagram illustrating an example of a binarized image (normal).

In FIG. 7, the upper stage illustrates an image of product salad cups, and the lower stage illustrates a binarized image of the image. In FIG. 7, the display of the image is normal. However, the gaps between the products in FIG. 7 slightly vary.

Figure 8:
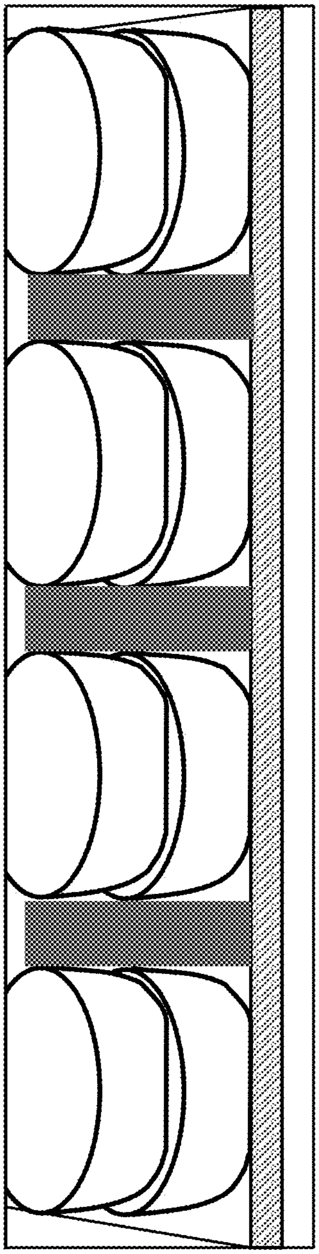
FIG. 8 is a diagram illustrating an example of a gap (an interval between products) in a shelf image.

FIG. 8 illustrates a normal display state of product pasta cups. Since the product pasta cup has a large width, the gap between the products is large accordingly. However, it is necessary to determine that the display anomaly occurs when the same gap is present between the product rice balls of FIG. 4. That is, an appropriate gap between the products differs depending on the width of the product, and it is necessary to determine whether the gap indicates the product shortage or the interval between the products based on the width of the product.

The binarization unit 12 delivers the binarized image to the generation unit 13 and the detection unit 14.

In a case where the ratio of the width of the gap region adjacent to the product to the width of the product region in the binarized image is a predetermined value or more, the detection unit 14 detects the anomaly of the display of the product. When the anomaly of the display is detected, the detection unit 14 transmits the detection result to the notification unit 17.

The width of the product includes the widths of the product imaged from a plurality of angles (for example, a width when a certain product is vertically placed, and a width when a certain product is horizontally placed).

The detection unit 14 obtains the above ratio using the square wave graph. Here, the square wave graph is a line indicating any one of binary values on a horizontal reference line in the binarized image (see FIG. 10, details will be described later). However, since noise is included in the actual binarized image, the value indicating the ratio obtained from the square wave graph may include an outlier. Therefore, the detection unit 14 may detect the anomaly of the display using an approximate curve obtained by smoothing the square wave graph. In this case, for example, the detection unit 14 receives the approximate curve from the generation unit 13, and detects the anomaly of the display of the product in a case where the ratio is a predetermined value or more in the approximate curve. The detection unit 14 may detect the anomaly of the display of the product when a value of the approximate curve falls below a predetermined threshold value in at least part thereof due to the ratio being equal to or more than a predetermined value.

The generation unit 13 delivers the generated approximate curve to detection unit 14. The gap region adjacent to a product refers to a region (gap) between a product and an adjacent product, a region (gap) between a product and a wall or partition of a product shelf, and a region (gap) between a product and one end (left or right side) of an image.

The approximate curve can be obtained, for example, by approximating a square wave graph by Fourier series expansion of a predetermined number of terms (the number of sine waves). Furthermore, a method other than Fourier series expansion may be used as long as the square wave graph can be approximated (smoothed).

Figure 9:
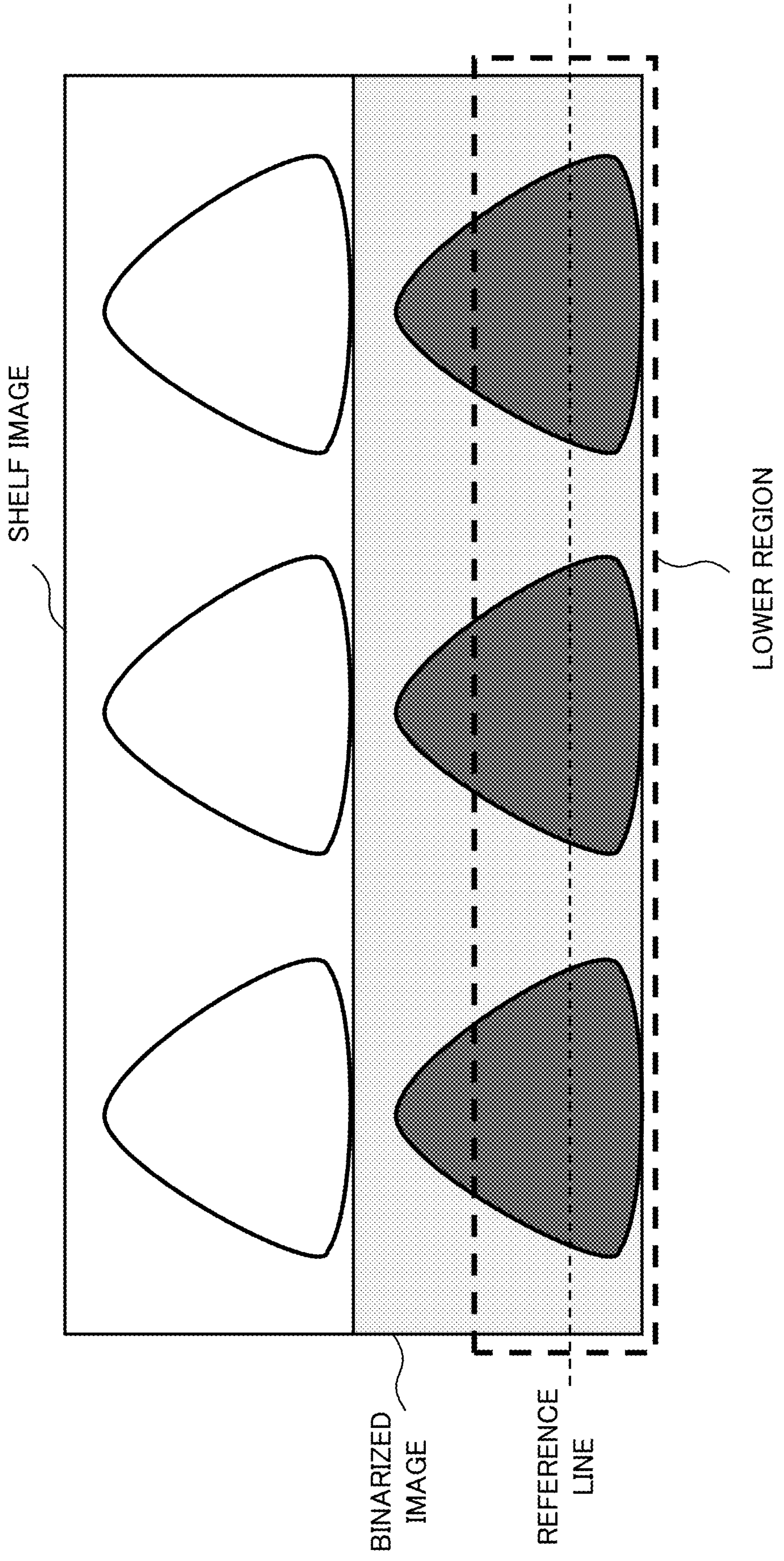
FIG. 9 is an example diagram illustrating a relationship between a shelf image and a binarized image.

Specific examples of operations of the generation unit 13 and the detection unit 14 in a case where an anomaly in display is detected using an approximate curve will be described. The upper stage of FIG. 9 illustrates a shelf image of a product rice ball, and the lower stage of FIG. 9 illustrates a binarized image of the shelf image. When the binarized image is horizontally divided at the center in the height direction and divided into an upper region and a lower region, the generation unit 13 provides a reference line as illustrated in FIG. 9 in the lower region. It is assumed that the position of the reference line is set in advance (for example, a line parallel to the lower side of the lower region and away one centimeter upward is set as a reference line).

Note that the reference line is provided in the lower region because a product is displayed in the lower region.

Figure 10:
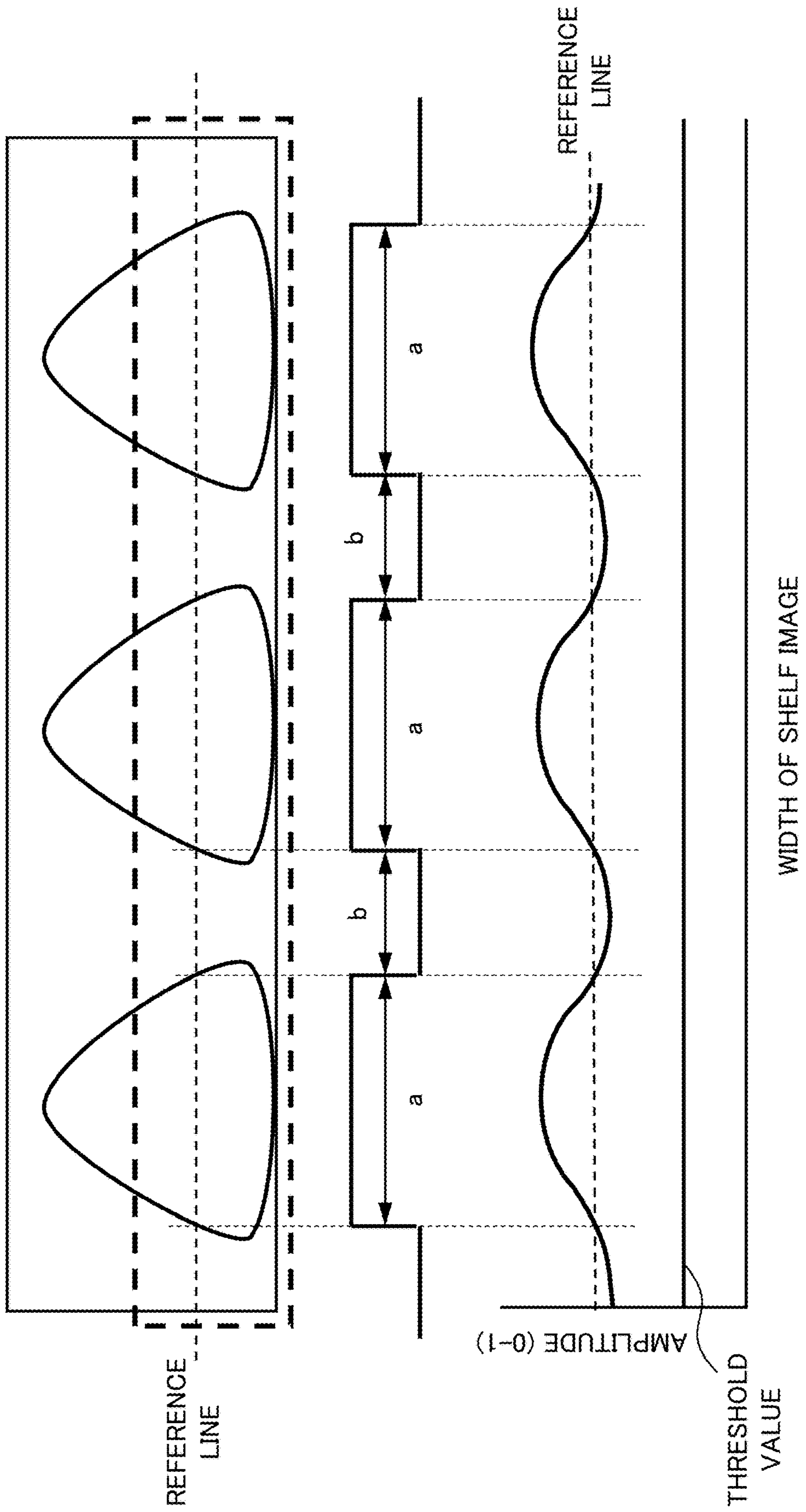
FIG. 10 is an example diagram illustrating a relationship between a binarized image, a graph, and an approximate curve.

Next, FIG. 10 illustrates a binarized image in the upper stage, a graph of a square wave shape in the middle stage, and an approximate curve in the lower stage. The square wave graph in the middle stage of FIG. 10 is a graph of a square wave generated based on the reference line of the binarized image illustrated in the upper stage of FIG. 10. The width from the rising to the falling of the edge of the square wave graph indicates the width a of the product on the reference line, and the width from the falling to the rising of the edge of the square wave graph indicates the gap b between the products or between the product and the wall.

The generation unit 13 generates an approximate curve of the square wave graph (see the lower stage of FIG. 10). The horizontal axis of the approximate curve graph represents the width (constant) of the shelf image, and the vertical axis represents the amplitude (for example, from 0 to 1) of the approximate curve. The threshold value on the vertical axis is a value for detecting an anomaly.

The detection unit 14 obtains a ratio of the gap b to the width a of the product, where the width obtained by the approximate curve exceeding the predetermined reference value is defined as the width a of the product, and the width obtained by the approximate curve falling below the predetermined reference value is defined as the gap b. The detection unit 14 obtains the ratio of the gap b between the products to the width a of the product using the approximate curve in this manner, so that it is possible to eliminate the outlier caused by the noise included in the binarized image, improve the detection accuracy, and prevent unnecessary detection result notification from being transmitted to the store terminal 2.

The detection unit 14 may determine that there is an anomaly when at least part of the approximate curve falls below this value. This threshold value is set by a designer. For example, when the width of the product cup noodles is 1, the interval (gap width) between the products is set to be lower than 0.3 (that is, the ratio of the width of the product to the gap is 1:0.3 or less) although it is affected by the size of the product shelf.

Figure 11:
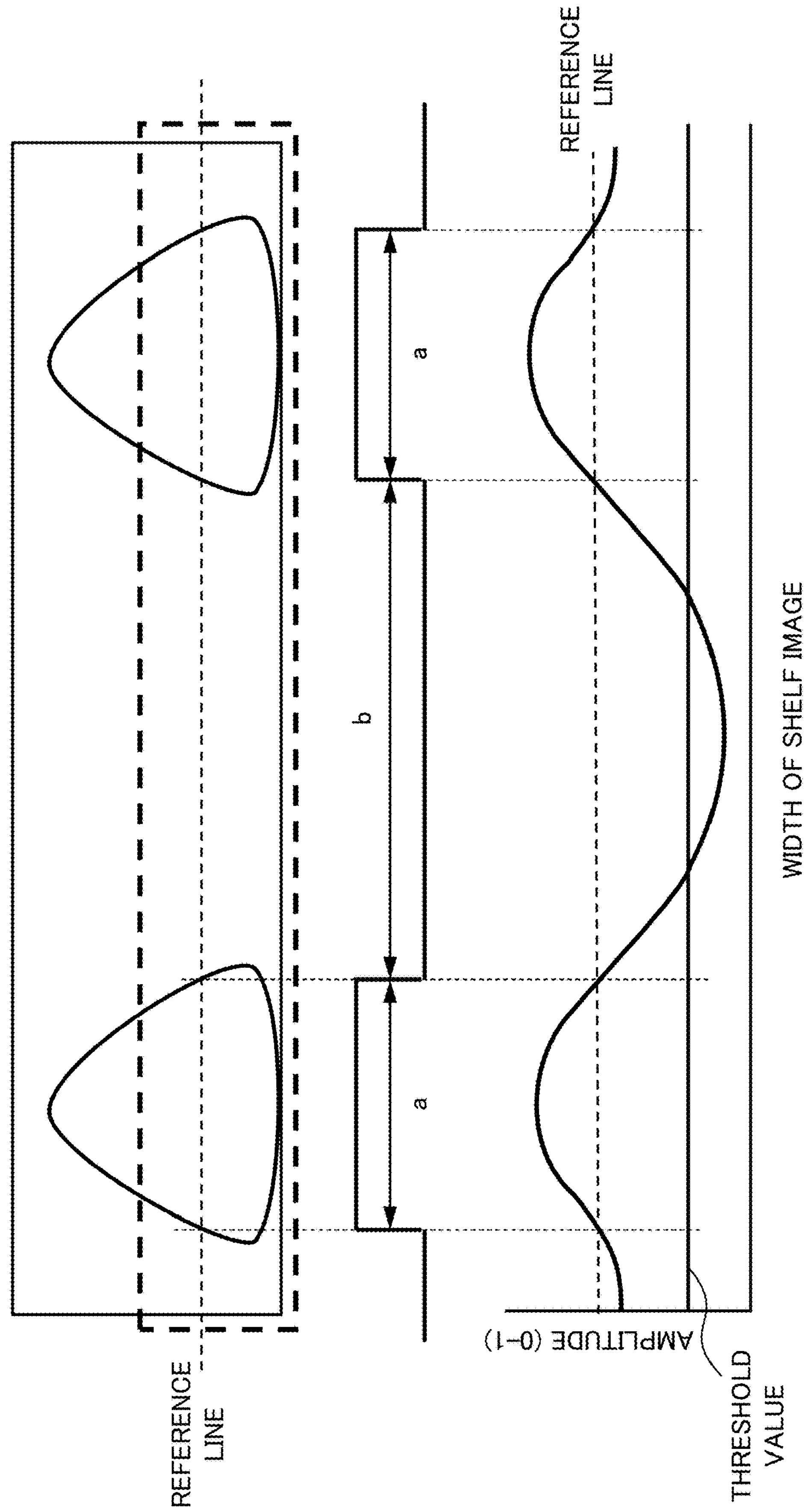
FIG. 11 is an example diagram illustrating a relationship between a binarized image, a graph, and an approximate curve.

In FIG. 10, since the product rice ball is normally disposed, the approximate curve is a regular gentle ridge-trough curve with an amplitude of a predetermined width. Here, it is assumed that the center rice ball among the three product rice balls in the upper stage of FIG. 9 has been removed (purchased). In this case, since a wide gap indicating that there is no product rice ball is formed at the center, and the binarized image in the upper stage changes as illustrated in FIG. 11, the gap b is larger than the width a of the product in the graph of the square wave shape in the middle stage, and the ratio of the gap b to the width a of the product is larger than 0.3. Therefore, the detection unit 14 detects the anomaly of the display of the product as the ratio of the gap b between the products to the width a of the product is a predetermined value or more. Furthermore, as illustrated in the lower stage of FIG. 11, the detection unit 14 detects the anomaly of the display of the product as part of the approximate curve generated based on the graph falls below the threshold value.

The detection unit 14 performs detection based on the above ratio using the model stored in the model storage unit 16.

Note that the detection unit 14 may consider the shape of the shelf at the time of detection. This is because, display of products varies depending on the shape of the shelf as there may be a region (gap) where products are not exceptionally disposed, or the shelf base with a larger width may be a wider interval between products than the shelf base with a smaller width. The shape of the shelf is, for example, a type of the product shelf or a shape of the product shelf (the number of display stages, a shape of a display stage, etc.). The shape of the shelf may be included in the shelf information of the shelf information storage unit 15 in advance.

Upon receiving a notification from the detection unit 14 that an anomaly (for example, product shortage, product stockout, display disturbance) in the display state of the product has been detected, the notification unit 17 notifies the store terminal 2 of a result of the detection.

(Store Terminal)

Figure 12:
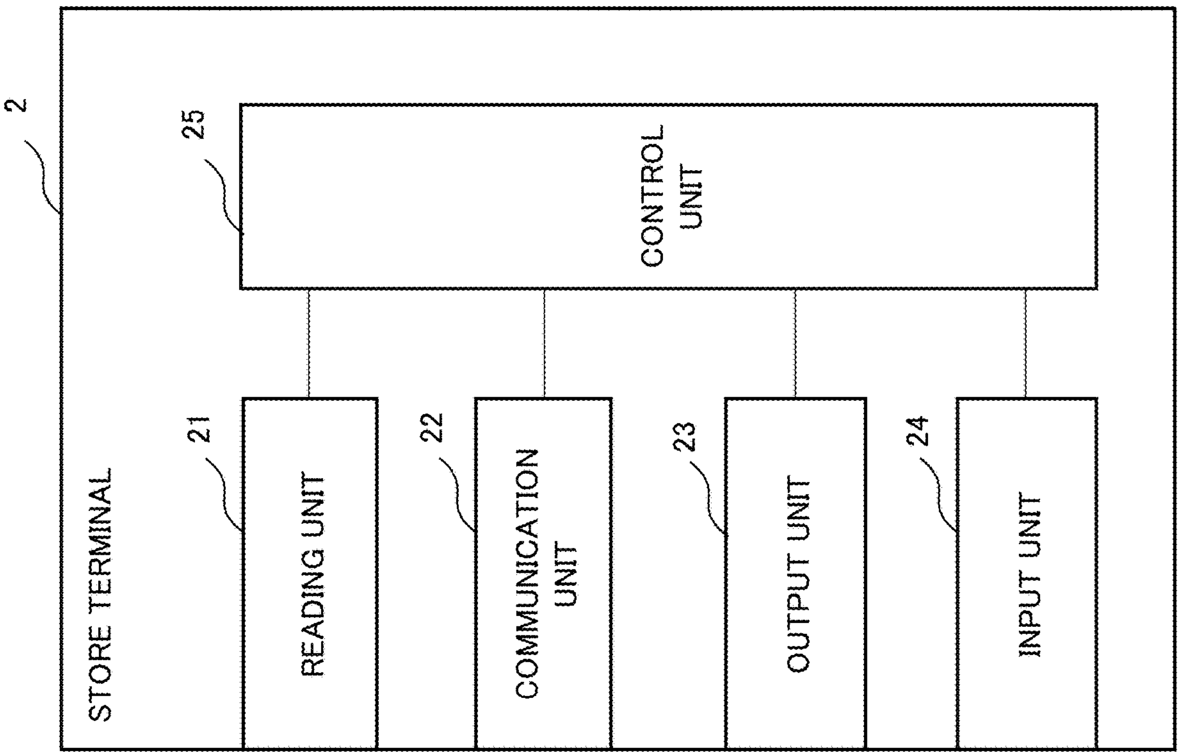
FIG. 12 is a diagram illustrating an internal configuration example of a store terminal.

Next, the store terminal 2 will be described with reference to FIG. 12. The store terminal 2 is a terminal provided for each store and used by a store clerk for product management. The store terminal 2 includes, for example, a reading unit 21, a communication unit 22, an output unit 23, an input unit 24, and a control unit 25.

The reading unit 21 reads product information (such as a barcode). The communication unit 22 performs communication between the store terminal 2 and an external device (for example, the product detection device 1).

Output unit 23 displays the information read by the reading unit 21 and the information (for example, a detection result or an exception setting screen to be described later) received from the external device (the notification unit 17 of the product detection device 1) on a display (not illustrated).

The input unit 24 is a keyboard, a touch panel, or the like for a store clerk to input information to the store terminal 2.

The control unit 25 is connected to the reading unit 21, the communication unit 22, the output unit 23, and the input unit 24, and controls operations of these units.

(Operation of Product Detection Device)

Figure 13:
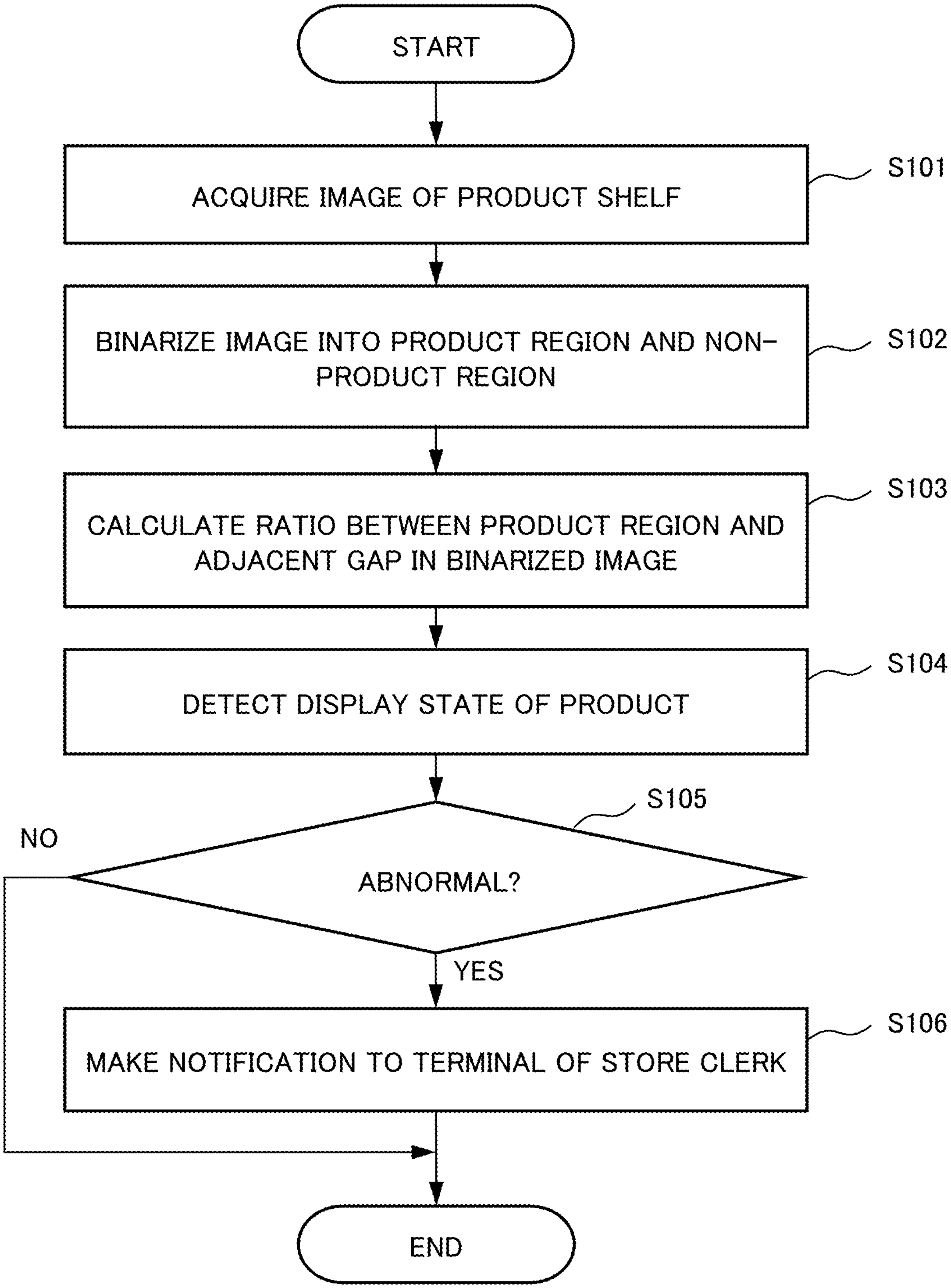
FIG. 13 is a flowchart illustrating an operation example of the product detection device according to the first example embodiment of the present disclosure.

An operation of the product detection device 1 in the product detection system 100 will be described with reference to a flowchart illustrated in FIG. 13. As a premise, the shelf information is stored in the shelf information storage unit 15, and a model is stored in the model storage unit 16.

First, in step S101, the image acquisition unit 11 acquires a shelf image that is one section of the product shelf captured by the camera 3. The acquired shelf image is delivered to the binarization unit 12.

In step S102, the binarization unit 12 binarizes a region in the shelf image into a product region in which the product appears and a non-product region in which a thing other than the product appears. The binarization unit 12 delivers the binarized image to the generation unit 13.

In step S103, the detection unit 14 calculates the ratio of the width of the gap region adjacent to the product (the gap between the products, or the like) to the width of the product region in the binarized image. In step S104, in a case where the ratio is a predetermined value or more, the detection unit 14 detects an anomaly in display of the product.

Steps S103 and S104 may be detected using an approximate curve. In this case, the generation unit 13 generates an approximate curve according to the width of the binarized product region and the width of the gap region adjacent to the product. The generation unit 13 delivers the generated approximate curve to detection unit 14. The detection unit 14 detects the anomaly of the display of the product in a case where a value of the approximate curve is less than a predetermined threshold value in at least part of the approximate curve received from the generation unit 13 due to the ratio being equal to or more than a predetermined value.

When the detection unit 14 detects an anomaly (for example, product shortage, product stockout, display disturbance) in display of products included in the shelf image (YES in step S105), the detection unit 14 transmits a detection result (for example, the fact that a product shortage or a product stockout has occurred, of the fact that display disturbance has occurred) to the notification unit 17, and the process proceeds to step S106. When the detection unit 14 does not detect the anomaly (NO in step S105), the process is ended.

In step S106, the notification unit 17 transmits the detection result to the store terminal 2.

As described above, the operation of the product detection device 1 in the product detection system 100 is ended.

Effects of First Example Embodiment

According to the first example embodiment of the present disclosure, it is possible to improve the detection accuracy of the product display state in the store and improve the efficiency of replenishment work of products to the display shelf. This is because the image acquisition unit 11 acquires an image of a shelf for displaying products, the binarization unit 12 binarizes a region in the image into a product region where the product appears and a non-product region where a thing other than the product appears, and the detection unit 14 detects the display state of products displayed on the shelf in accordance with the width of the binarized product region and the width of a gap region adjacent to the product.

Second Example Embodiment

In the first example embodiment of the present disclosure, the shelf image is captured from the front. In practice, the shelf stand has a depth, and products are displayed from the front to the rear. However, in the shelf image captured from the front, it is difficult to grasp the number and the state of products displayed on the rear side. Therefore, in the second example embodiment, there is disclosed a method for detecting a state or the like of products displayed at the rear by performing weighting (for example, stereoscopic process) in such a way that the product region and the non-product region are enlarged toward the rear from the front of the shelf base in the display of the product.

(Product Detection System)

Figure 14:
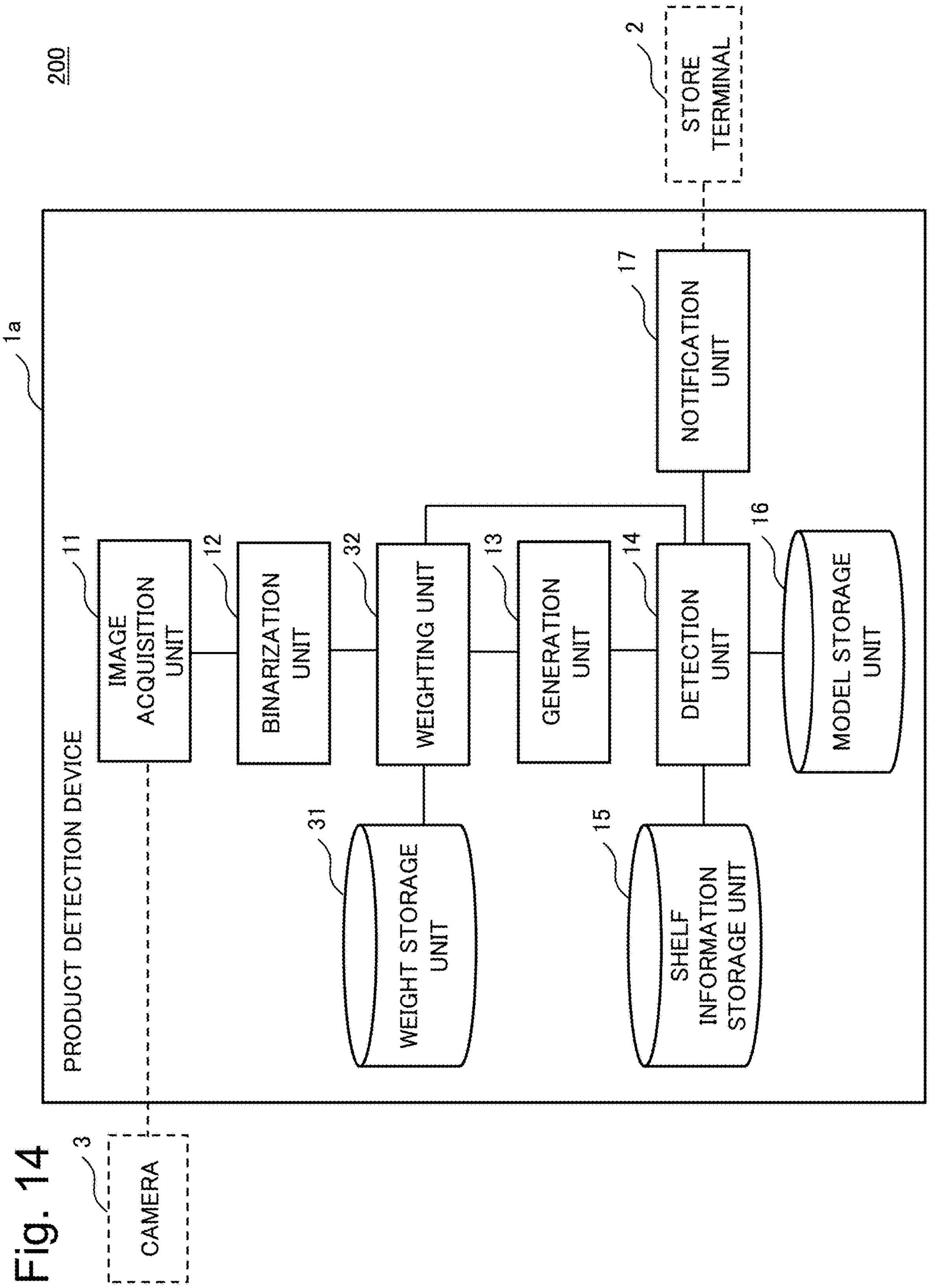
FIG. 14 is a diagram illustrating a configuration example of a product detection system according to the second example embodiment of the present disclosure.

FIG. 14 is a block diagram conceptually illustrating a configuration example of a product detection system 200 according to the second example embodiment of the present disclosure. The product detection system 200 includes a product detection device 1*a*, the store terminal 2, and the camera 3.

The product detection device 1*a* includes the image acquisition unit 11, the binarization unit 12, the generation unit 13, the detection unit 14, the shelf information storage unit 15, the model storage unit 16, the notification unit 17, a weight storage unit 31, and a weighting unit 32.

Figure 15:
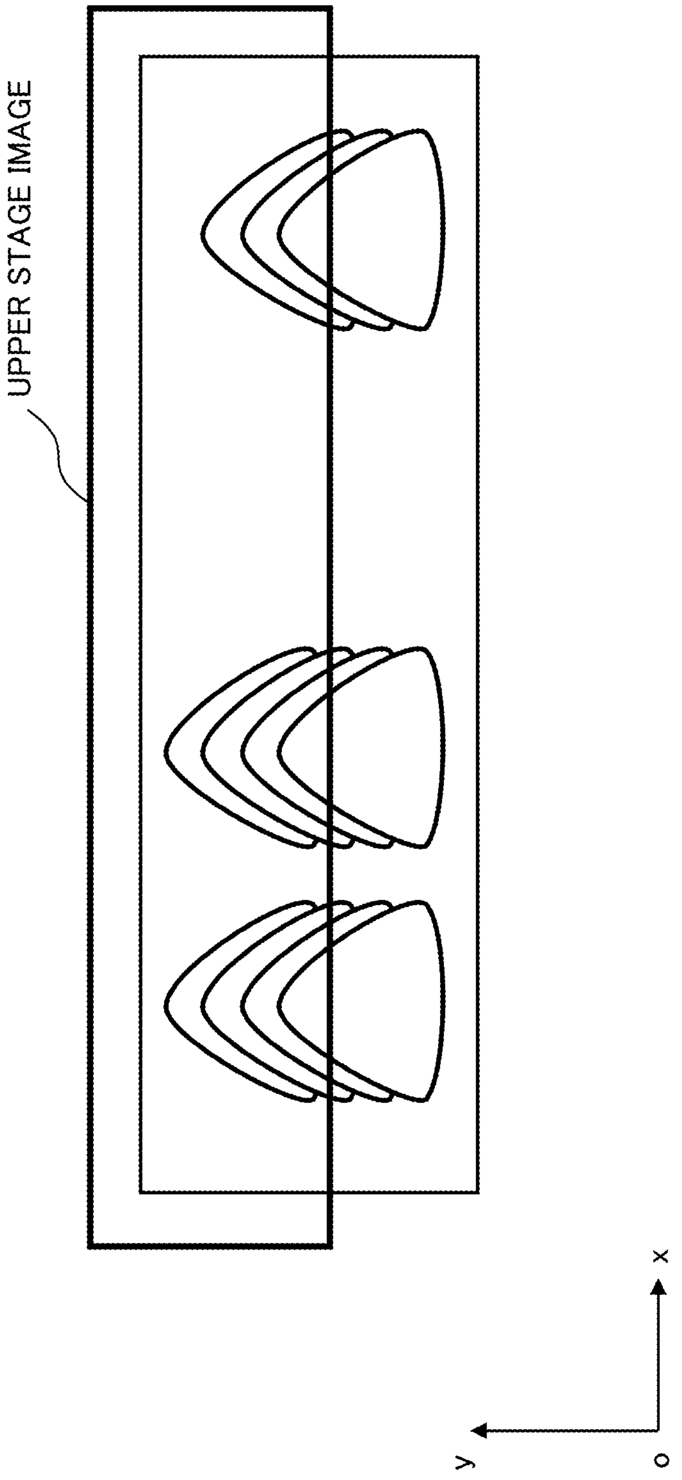
FIG. 15 is a view illustrating an example of a shelf image captured from the front.
Figure 16:
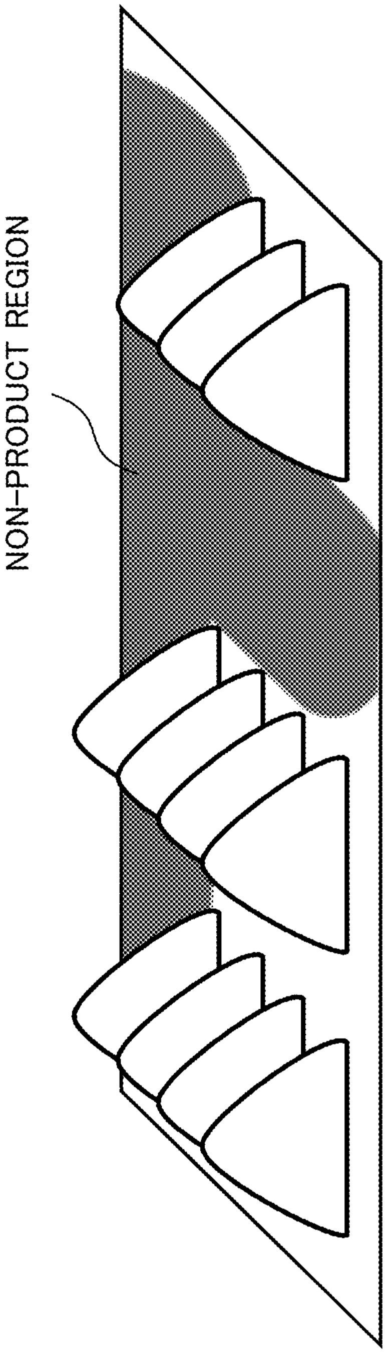
FIG. 16 is a view illustrating an example of a shelf image captured obliquely from above.

The weighting unit 32 performs weighting in such a way that the product region and the non-product region are enlarged toward the rear from the front of the shelf in the shelf image. The weighting processing will be described with a specific example. FIG. 15 is a shelf image of the product rice ball. The x-axis indicates the number of pixels of the shelf width, and the y-axis indicates the number of pixels of the shelf height. In the shelf base of the shelf image, rice balls can be displayed in four rows from the front toward the rear. The diagram of FIG. 15 when viewed obliquely from above is FIG. 16, and when the shelf image of FIG. 16 is viewed, 4 rice balls A are disposed in the first column from the left, 4 rice balls B are disposed in the second column from the left, no display is disposed in the third column from the left, and 3 rice balls C are disposed in the fourth column from the left (right end). Note that the gray region represents a non-product region where no products are displayed.

Figure 17:
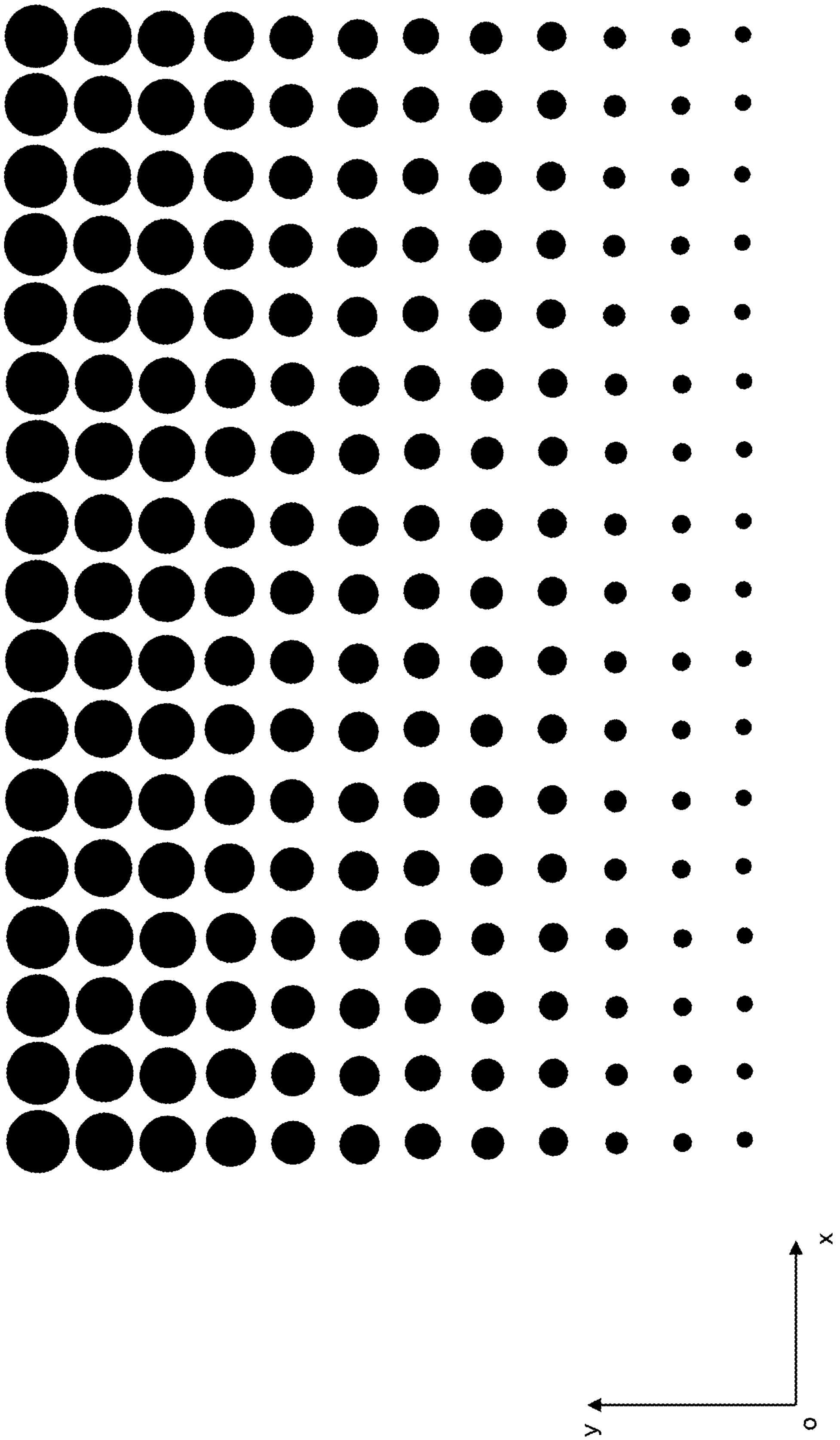
FIG. 17 is a diagram schematically illustrating weighting of pixels from the front toward the rear.

In order to accurately grasp the number of products at rear side from the front view of FIG. 15, the weighting unit 32 performs weighting by focusing on the upper stage image of the shelf image of FIG. 15. That is, the weighting unit 32 performs weighting in such a way that the overlapping portion of the plurality of rice ball images in the upper stage image is emphasized. The weighting unit 32 performs weighting on respective pixels constituting the shelf image of FIG. 15 in such a way that the higher the height of the shelf is, that is, the larger the value of the number of pixels of the y axis is, the larger the pixel is, (see FIG. 17). Note that circles in FIG. 17 schematically illustrate pixels. Note that a weighting table and a weighting formula for weighting pixels are stored in the weight storage unit 31. Specifically, the weighting table is table data for allocating the size of the pixel to the value of the number of pixels on the y axis, and the weighting formula is a function of calculating the size of the pixel from the value of the number of pixels on the y axis.

Figure 18:
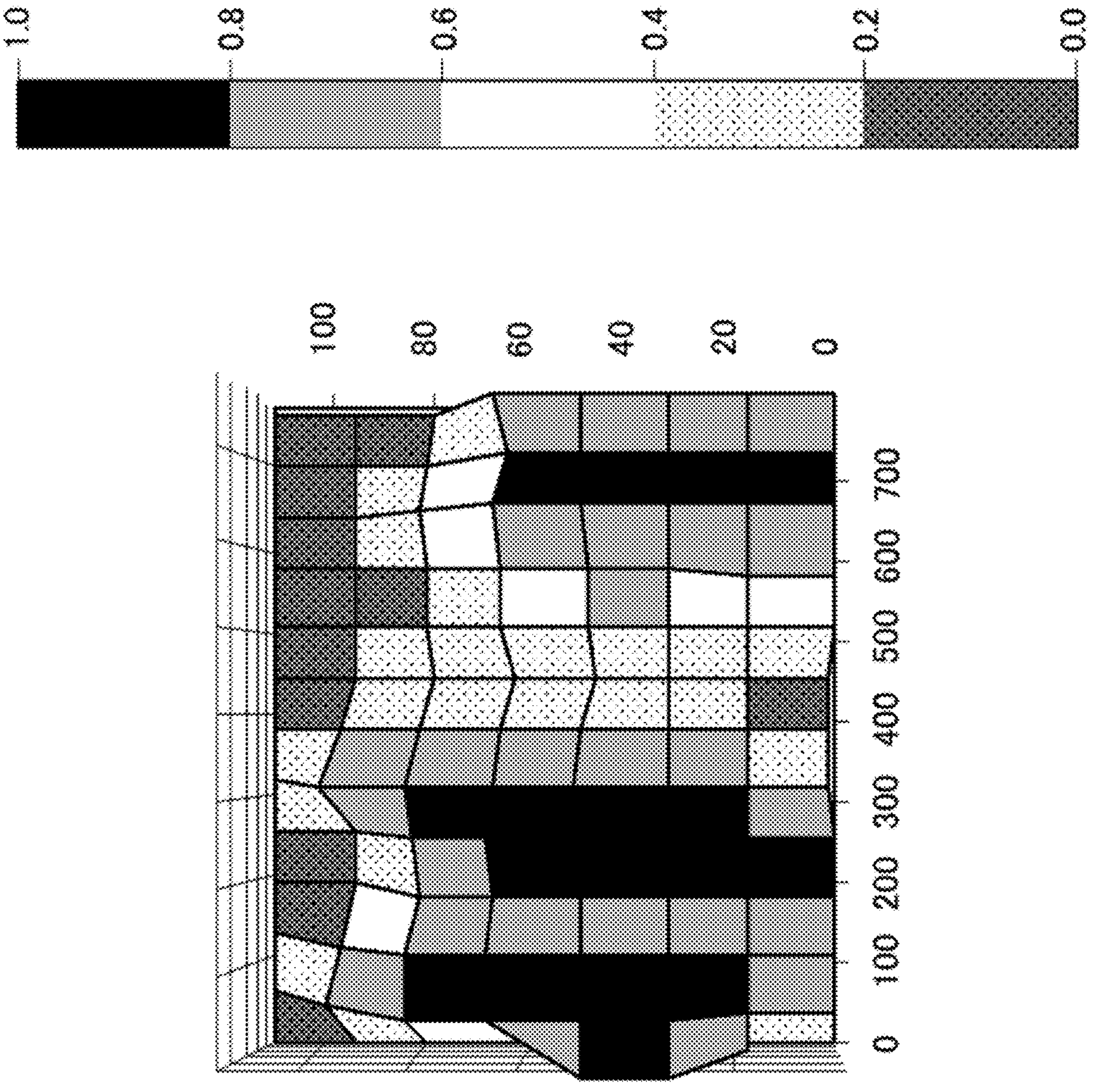
FIG. 18 is a view illustrating an example of a stereoscopic image illustrating the shelf image of FIG. 15.
Figure 18:
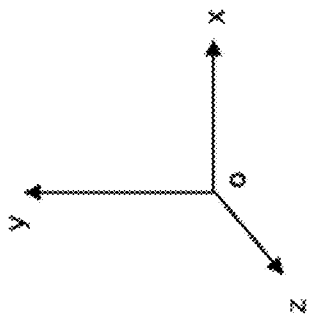
Figure 19:
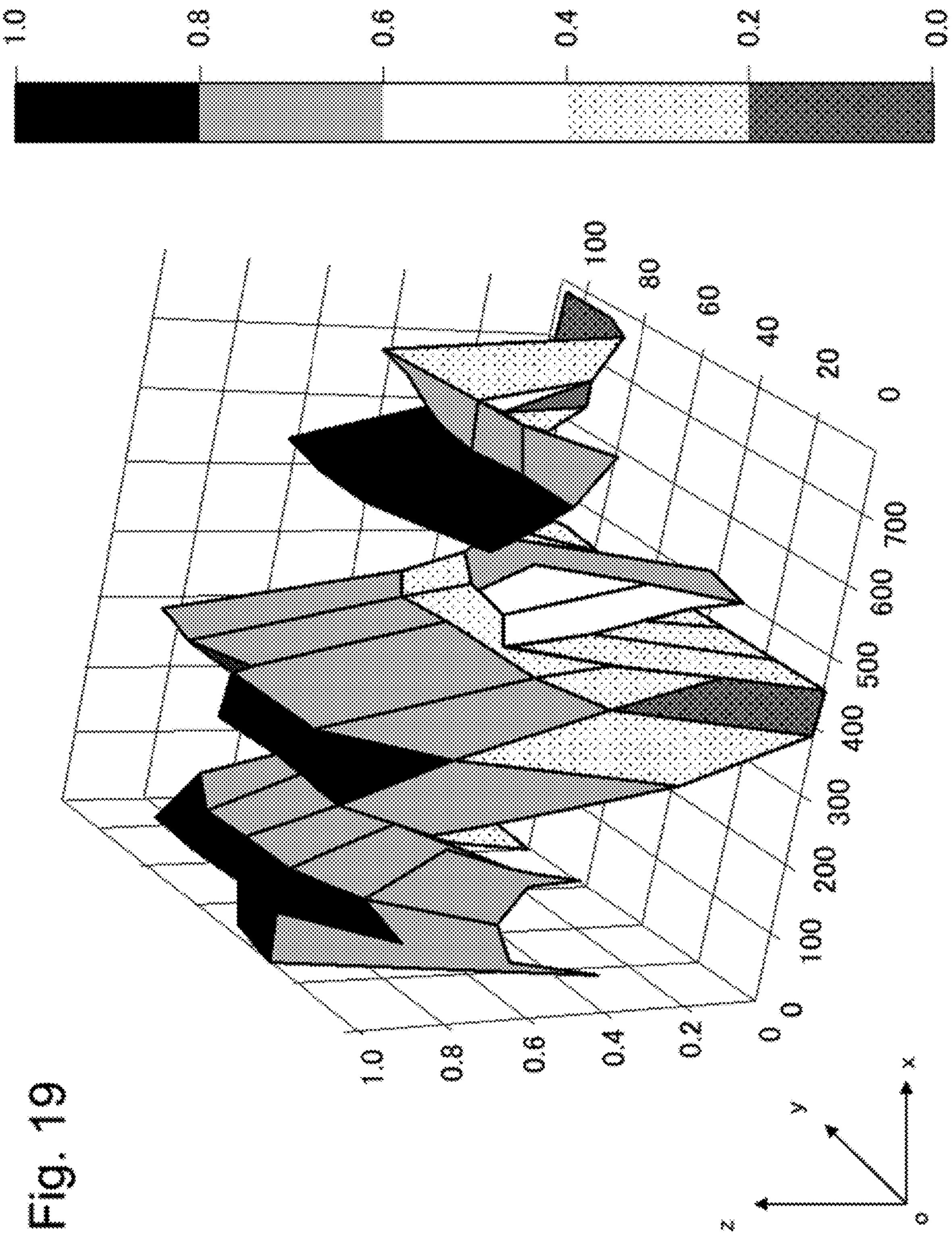
FIG. 19 is a view illustrating an example of a stereoscopic image illustrating the shelf image of FIG. 15.

As a result of the weighting, the weighting unit 32 outputs the stereoscopic image illustrated in FIG. 18 from the front image of FIG. 15. In FIG. 18, the x axis represents the number of pixels (unit: 10,000) of the width of the shelf image in FIG. 15, the y axis represents the number of pixels (unit: 10,000) of the height of the shelf image in FIG. 15, and the z axis represents the certainty of the product region or the non-product region in a range of 1 to 0. When the certainty of the product region is high, it is indicated as 1, and when the certainty of the non-product region is high, it is indicated as 0. Note that, in FIG. 18 (and FIG. 19), as the certainty is closer to 1, the region is displayed in black, and as the accuracy is closer to 0, the region is displayed in white. Note that FIG. 18 is equivalent to a view of FIG. 15 when viewed from directly above. FIG. 18 is rotated by 90 degrees around the x axis and further rotated clockwise by about 30 degrees around the y axis to obtain the stereoscopic image of FIG. 19. FIG. 19 is a stereoscopic image related to the view when viewing FIG. 15 obliquely from above. In this manner, the depth (see FIG. 16) of the shelf image of FIG. 15 can be determined using the stereoscopic images of FIGS. 18 and 19.

By making the determination based on the stereoscopic image in this manner, even in a case where it is difficult to determine whether the product is disposed on the front side or a little rear side in the shelf image captured from the front side, it is possible to accurately detect the product position. Note that, in general, it is necessary to arrange the products on the frontmost side of the product shelf, and in a case where it is detected that the products are disposed slightly on the rear side, a detection result notification (display anomaly alert) to the store terminal 2 is made.

Other devices and units are the same as those in the first example embodiment.

(Operation of Product Detection Device)

Figure 20:
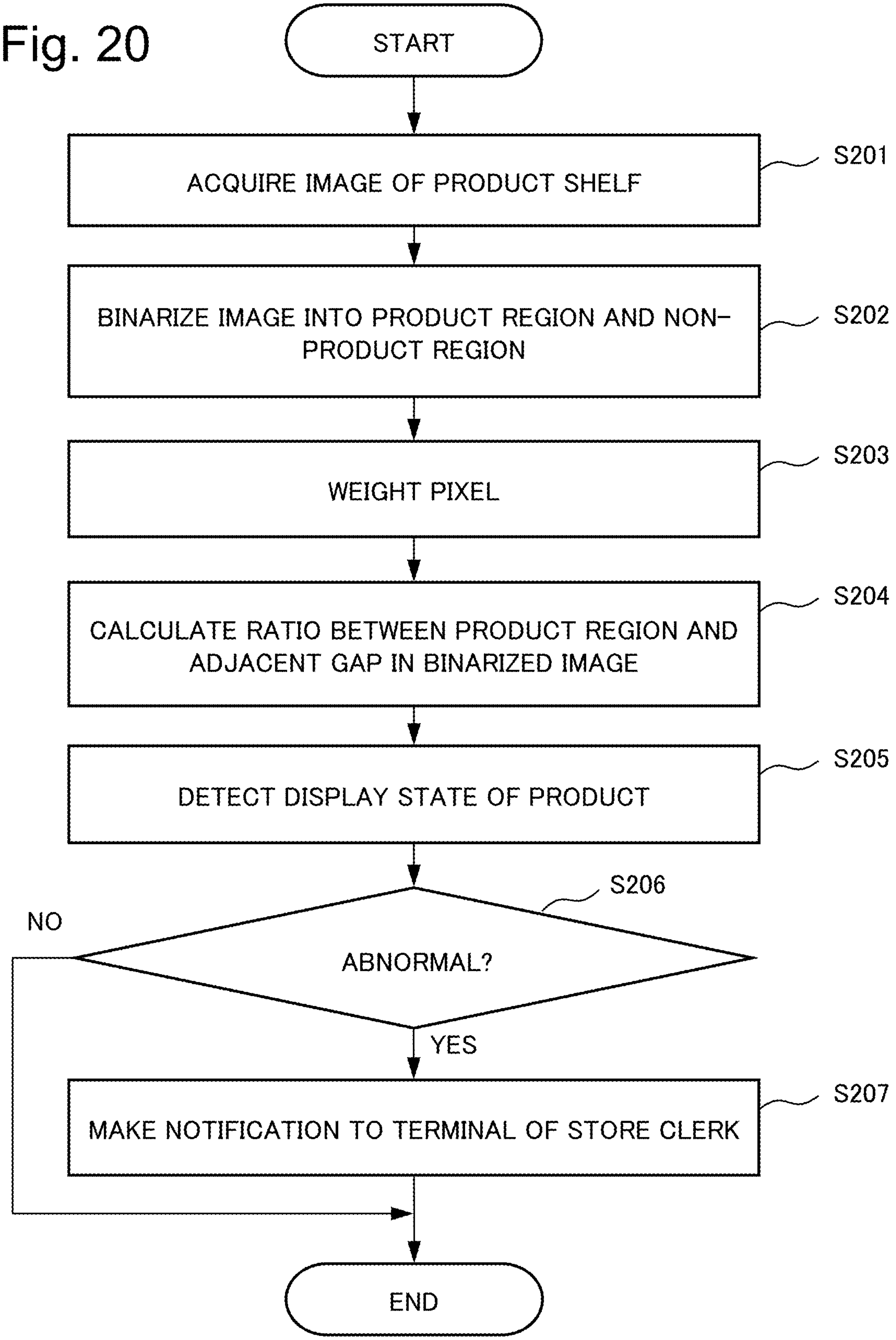
FIG. 20 is a flowchart illustrating an operation example of the product detection device according to the second example embodiment of the present disclosure.

An operation of the product detection device 1*a* in the product detection system 200 will be described with reference to a flowchart illustrated in FIG. 20. As a premise, the shelf information is stored in the shelf information storage unit 15, and a model is stored in the model storage unit 16.

First, steps S201 to S202 are similar to steps S101 to S102 of the first example embodiment.

In step S203, the weighting unit 32 weights the pixels of the binarized shelf image. As a result of the weighting, the weighting unit 32 generates the stereoscopic image illustrated in FIG. 18.

In step S204, a detection unit 14 calculates a ratio between the product region and the gap adjacent to the product region from the weighted binarized image (see FIG. 18). Specifically, the detection unit 14 performs the ratio calculation process in the xy plane of FIG. 18.

In addition, the detection unit 14 may cut the pixels of the y axis into a plane parallel to the xz plane in 200,000 pixel increment in the stereoscopic image (weighted binarized image) in FIG. 19. As a result, the detection unit 14 can obtain an image similar to the front view of the shelf image from the front side to the rear side of the shelf image in FIG. 15 (see FIG. 10), and calculate the ratio between the product region and the gap adjacent to the product region in the image.

Steps S205 to S207 are similar to steps S104 to S106 of the first example embodiment.

Thus, the operation of the product detection device 1*a* in the product detection system 200 is ended.

Effects of Second Example Embodiment

According to the second example embodiment of the present disclosure, it is possible to improve the detection accuracy of the product display state in the store and improve the efficiency of replenishment work of products to the display shelf. This is because the image acquisition unit 11 acquires an image of a shelf for displaying products, the binarization unit 12 binarizes a region in the image into a product region where the product appears and a non-product region where a thing other than the product appears, and the detection unit 14 detects the display state of products displayed on the shelf in accordance with the width of the binarized product region and the width of a gap region adjacent to the product.

Furthermore, this is because the weighting unit 32 makes the stereoscopic image by performing weighting in such a way that the product region and the non-product region are enlarged toward the rear from the front of the shelf in the display of the product, thereby detecting the display state of the product on the rear side of the shelf.

<Modifications>

Figure 21:
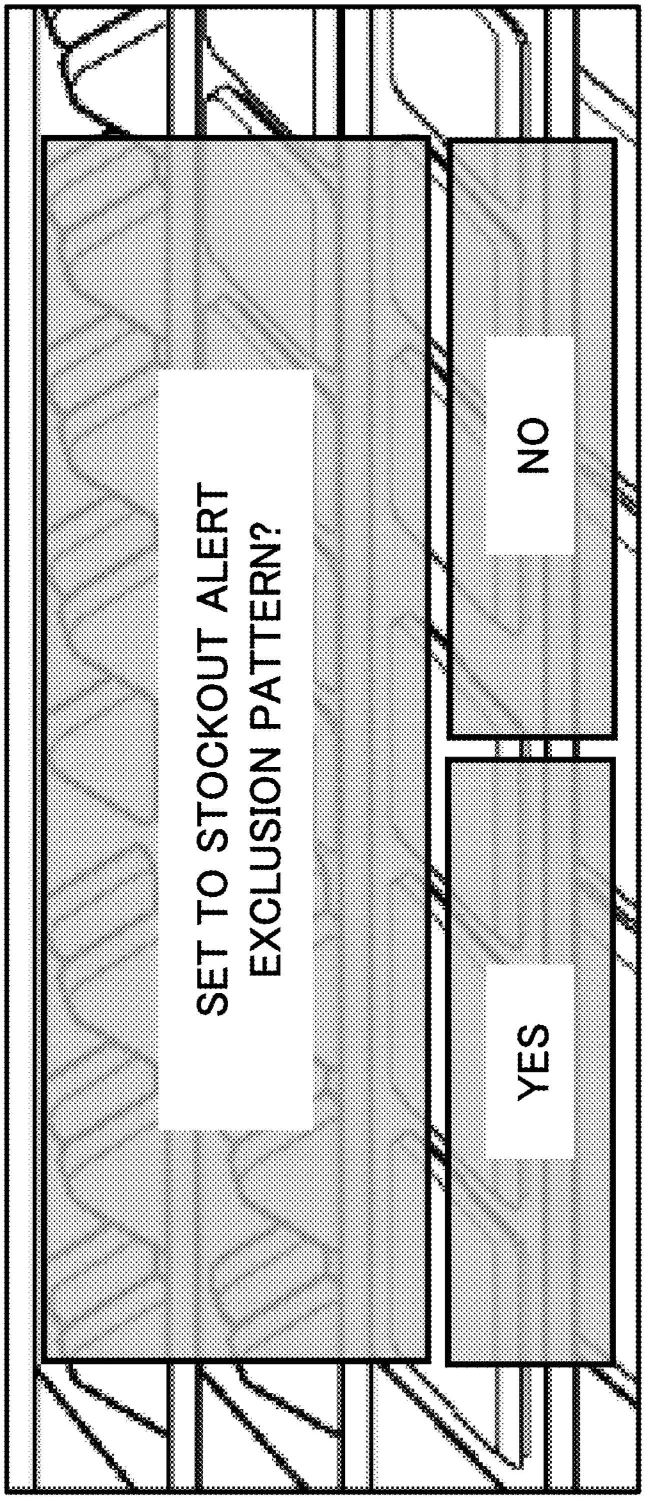
FIG. 21 is a view illustrating an example of a stockout alert exclusion pattern screen.

Modifications of the first example embodiment and the second example embodiment will be described below. At the time of the binarization process by the binarization unit 12, even when there is a gap, it is exceptionally determined to be normal (see FIG. 6). Exceptionally determined to be normal includes, for example, a case where a gap is formed due to the shape of the shelf, a case where the stock quantity of the product is insufficient even when it should be displayed, and the like. The notification unit 17 may transmit a stockout alert exclusion pattern screen as illustrated in FIG. 21 when notifying the store terminal 2 of the detection result (display anomaly) in such a way that the detection unit 14 does not detect an anomaly in such a case. When the notification unit 17 receives a notification indicating that the stockout alert exclusion pattern is set ("Yes" in FIG. 21) from the store terminal 2, the notification unit 17 delivers this notification to the detection unit 14, and the detection unit 14 stores the information indicating the stockout alert exclusion pattern in the information about the corresponding shelf in the shelf information storage unit 15. As a result, even when the result represents the display anomaly, the detection unit 14 excludes information stored as the stockout alert exclusion pattern in the information about the corresponding shelf in the shelf information storage unit 15 from the display anomaly. That is, unnecessary notification is prevented from being transmitted to the store terminal 2. As the stockout alert exclusion pattern, a combination of many products is conceivable. Therefore, it is preferable that the stockout alert exclusion pattern is learned using machine learning, and a pattern similar to the stockout alert exclusion pattern is also included in the stockout alert exclusion pattern.

Third Example Embodiment

Figure 22:
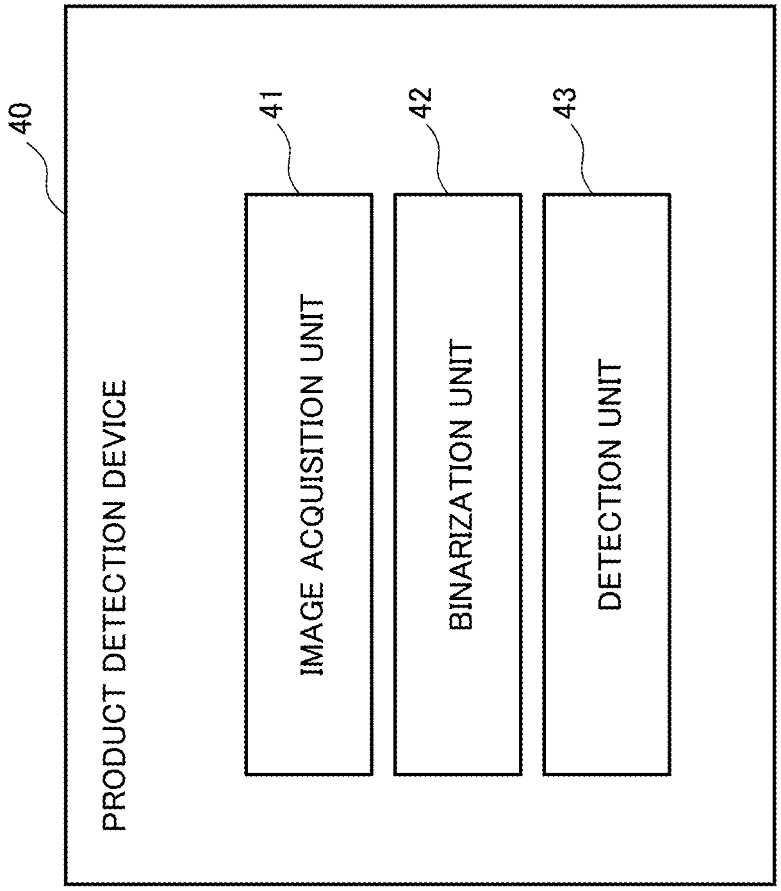
FIG. 22 is a diagram illustrating a configuration example of a product detection device according to the third example embodiment of the present disclosure.

A product detection device 40 according to the third example embodiment of the present disclosure will be described with reference to FIG. 22. The product detection device 40 is a minimum configuration mode of the first example embodiment and the second example embodiment. A product detection device 40 includes an image acquisition unit 41, a binarization unit 42, and a detection unit 43.

The image acquisition unit 41 acquires an image of a shelf on which a product is displayed. The binarization unit 42 binarizes a region in the image into a product region in which the product appears and a non-product region in which a thing other than the product appears. The detection unit 43 detects the display state of the product displayed on the shelf according to the width of the binarized product region and the width of the gap region adjacent to the product.

According to the third example embodiment of the present disclosure, it is possible to improve the detection accuracy of the product display state in the store and improve the efficiency of replenishment work of products to the display shelf. This is because the image acquisition unit 41 acquires an image of a shelf for displaying products, the binarization unit 42 binarizes a region in the image into a product region where the product appears and a non-product region where a thing other than the product appears, and the detection unit 43 detects the display state of products displayed on the shelf in accordance with the width of the binarized product region and the width of a gap region adjacent to the product.

<Hardware Configuration>

Figure 23:
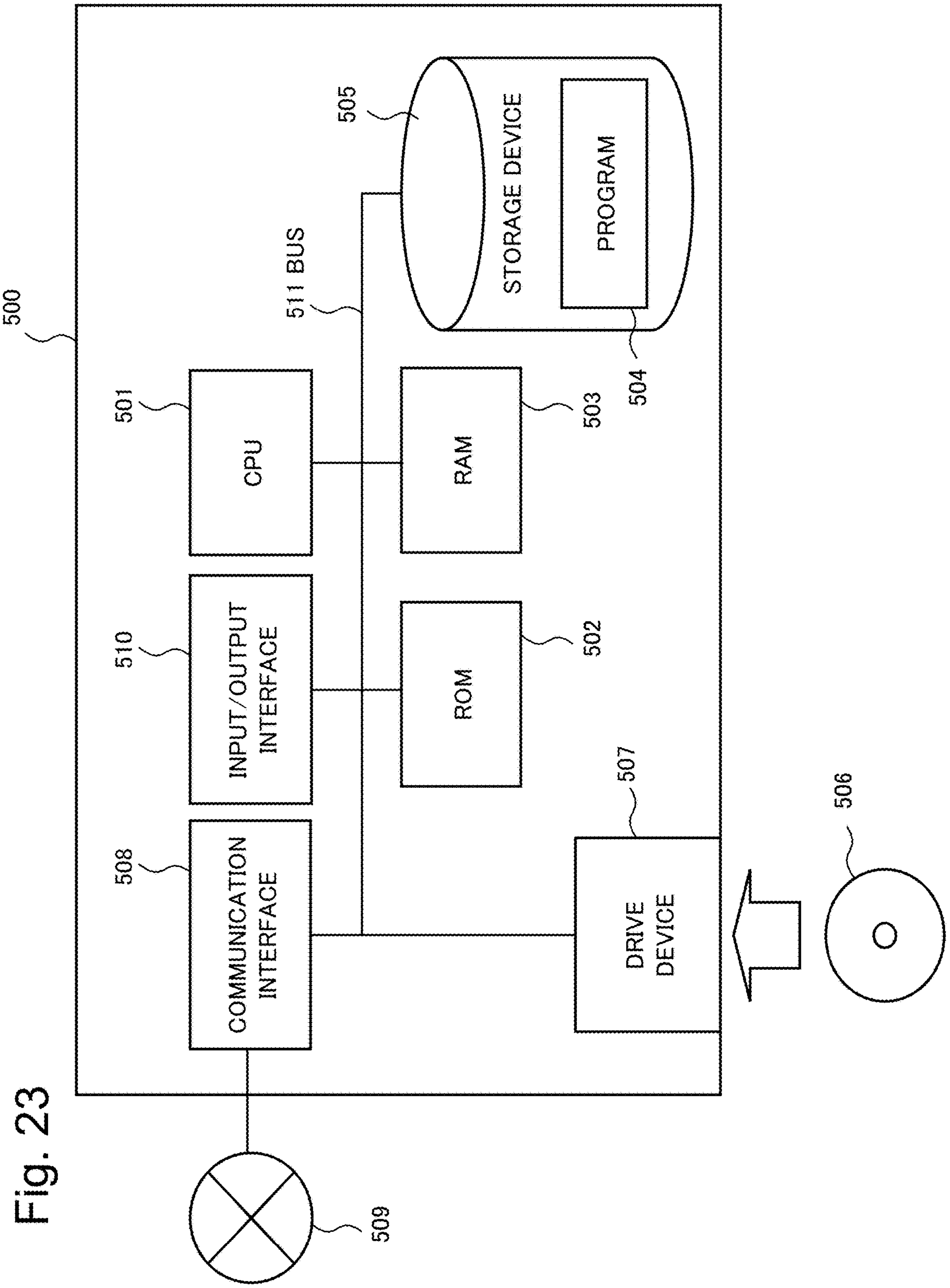
FIG. 23 is a block diagram illustrating a hardware configuration example of a computer that implements each device of the product detection system.

In the respective example embodiments of the present disclosure, each component of each device (product detection device 1, 1*a*, 40, or the like) included in each of the product detection systems 100, 200 indicates a block of a functional unit. Part or all of each component of each device is achieved by, for example, an any combination of an information processing device (computer) 500 and a program as illustrated in FIG. 23. The information processing device 500 includes the following configuration as an example.

- central processing unit (CPU) 501
- read only memory (ROM) 502
- random access memory (RAM) 503
- program 504 loaded into RAM 503
- storage device 505 storing program 504
- drive device 507 that reads and writes recording medium 506
- communication interface 508 connected with a communication network 509
- input/output interface 510 for inputting/outputting data
- bus 511 connecting each component Each component of each device in respective example embodiments is achieved by the CPU 501 acquiring and executing the program 504 for achieving these functions. The program 504 for achieving the function of each component of each device is stored in the storage device 505 or the RAM 503 in advance, for example, and is read by the CPU 501 as necessary. The program 504 may be supplied to the CPU 501 via the communication network 509, or may be stored in advance in the recording medium 506, and the drive device 507 may read the program and supply the program to the CPU 501.

There are various modifications of the implementation method of each device. For example, each device may be achieved by an any combination of the information processing device 500 and the program separate for each component. A plurality of components included in each device may be achieved by an any combination of one information processing device 500 and a program.

Part or all of each component of each device is achieved by another general-purpose or dedicated circuit, processor, or the like, or a combination thereof. These may be configured by a single chip or may be configured by a plurality of chips connected via a bus.

Part or all of each component of each device may be achieved by a combination of the above-described circuit or the like and the program.

In a case where part or all of each component of each device is achieved by a plurality of information processing devices, circuits, and the like, the plurality of information processing devices, circuits, and the like may be disposed in a centralized manner or in a distributed manner. For example, the information processing device, the circuit, and the like may be achieved as a form in which each of the information processing device, the circuit, and the like is connected via a communication network, such as a client and server system, a cloud computing system, and the like.

Some or all of the above example embodiments may be described as the following Supplementary Notes, but are not limited to the following.

[Supplementary Note 1]

A product detection device including an image acquisition unit that acquires an image of a shelf on which a product is displayed, a binarization unit that binarizes a region in the image into a product region in which the product appears and a non-product region in which a thing other than the product appears, and a detection unit that detects a state of display of the product displayed on the shelf according to a width of the binarized product region and a width of a gap region adjacent to the product.

[Supplementary Note 2]

The product detection device according to Supplementary Note 1, wherein the detection unit detects an anomaly of the display of the product when a ratio of a width of the gap region to a width of the product region is a predetermined value or more.

[Supplementary Note 3]

The product detection device according to Supplementary Note 2, further including a generation unit that generates an approximate curve according to a width of the binarized product region and a width of the gap region, wherein the detection unit detects an anomaly of the display of the product when at least part of the approximate curve falls below a predetermined threshold value due to the ratio being equal to or more than a predetermined value.

[Supplementary Note 4]

The product detection device according to any one of Supplementary Notes 1 to 3, wherein a width of the product region includes a width of the product region associated with the product imaged from a plurality of angles.

[Supplementary Note 5]

The product detection device according to Supplementary Note 1, further including a model storage unit that stores one or more models learned, for each shelf shape, for detecting a state of display of the product displayed on the shelf, wherein the detection unit performs the detection using the model acquired from the model storage unit.

[Supplementary Note 6]

The product detection device according to Supplementary Note 1, further including a weighting unit that performs weighting in such a way that pixels of the product region and the non-product region are enlarged toward a rear from a front of the shelf in the display of the product, wherein the binarization unit binarizes the product region and the non-product region that were subjected to the weighting.

[Supplementary Note 7]

The product detection device according to Supplementary Note 1 or 3, further including a notification unit that notifies an external terminal of a result of the detection when the detection unit detects an anomaly in the display state of the product.

[Supplementary Note 8]

A product detection system including the product detection device according to any one of Supplementary Notes 1 to 7, a camera that captures the image to transmit the captured image to the product detection device, and a terminal that receives a notification related to the detection from the product detection device.

[Supplementary Note 9]

A product detection method including acquiring an image of a shelf on which a product is displayed, binarizing a region in the image into a product region in which the product appears and a non-product region in which a thing other than the product appears, and detecting a state of display of the product displayed on the shelf according to a width of the binarized product region and a width of a gap region adjacent to the product.

[Supplementary Note 10]

The product detection method according to Supplementary Note 9 wherein the detecting includes detecting an anomaly of the display of the product when a ratio of a width of the gap region to a width of the product region is a predetermined value or more.

[Supplementary Note 11]

The product detection method according to Supplementary Note 10, further including generating an approximate curve according to a width of the binarized product region and a width of the gap region, wherein the detecting includes detecting an anomaly of the display of the product when at least part of the approximate curve falls below a predetermined threshold value due to the ratio being equal to or more than a predetermined value.

[Supplementary Note 12]

The product detection method according to any one of Supplementary Notes 9 to 11, wherein a width of the product region includes a width of the product region associated with the product imaged from a plurality of angles.

[Supplementary Note 13]

The product detection method according to Supplementary Note 9, wherein the detecting includes performing the detection using the model acquired from the model storage means configured to store one or more models learned, for each shelf shape, for detecting a state of display of the product displayed on the shelf.

[Supplementary Note 14]

The product detection method according to Supplementary Note 9, further including performing weighting in such a way that pixels of the product region and the non-product region are enlarged toward a rear from a front of the shelf in the display of the product, wherein the binarizing includes binarizing the product region and the non-product region that were subjected to the weighting.

[Supplementary Note 15]

The product detection method according to Supplementary Note 9 or 11, further including notifying an external terminal of a result of the detection when an anomaly in the display state of the product is detected in the detecting.

[Supplementary Note 16]

A recording medium storing a product detection program for causing a computer to execute acquiring an image of a shelf on which a product is displayed, binarizing a region in the image into a product region in which the product appears and a non-product region in which a thing other than the product appears, and detecting a state of display of the product displayed on the shelf according to a width of the binarized product region and a width of a gap region adjacent to the product.

[Supplementary Note 17]

The recording medium according to Supplementary Note 16, wherein the detecting includes detecting an anomaly of the display of the product when a ratio of a width of the gap region to a width of the product region is a predetermined value or more.

[Supplementary Note 18]

The recording medium according to Supplementary Note 17, the executing further including generating an approximate curve according to a width of the binarized product region and a width of the gap region, wherein the detecting includes detecting an anomaly of the display of the product when at least part of the approximate curve falls below a predetermined threshold value due to the ratio being equal to or more than a predetermined value.

[Supplementary Note 19]

The recording medium according to any one of Supplementary Notes 16 to 18, wherein a width of the product region includes a width of the product region associated with the product imaged from a plurality of angles.

[Supplementary Note 20]

The recording medium according to Supplementary Note 16, wherein the detecting includes performing the detection using the model acquired from the model storage means configured to store one or more models learned, for each shelf shape, for detecting a state of display of the product displayed on the shelf.

[Supplementary Note 21]

The recording medium according to Supplementary Note 16, the executing further including performing weighting in such a way that pixels of the product region and the non-product region are enlarged toward a rear from a front of the shelf in the display of the product, wherein the binarizing includes binarizing the product region and the non-product region that were subjected to the weighting.

[Supplementary Note 22]

The recording medium according to Supplementary Note 16 or 18, the executing further including notifying an external terminal of a result of the detection when an anomaly in the display state of the product is detected in the detecting.

While the present invention has been particularly shown and described with reference to example embodiments thereof, the present invention is not limited to these example embodiments. It will be understood by those of ordinary skill in the art that various changes in form and details may be made therein without departing from the spirit and scope of the present invention as defined by the claims.

REFERENCE SIGNS LIST

1 product detection device
**1*a*** product detection device
2 store terminal
3 camera
4 communication network
11 image acquisition unit
12 binarization unit
13 generation unit
14 detection unit
15 shelf information storage unit
16 model storage unit
17 notification unit
21 reading unit
22 communication unit
23 output unit
24 input unit
25 control unit
31 weight storage unit
32 weighting unit
40 product detection device
41 image acquisition unit
42 binarization unit
43 detection unit
100 product detection system
200 product detection system
500 information processing device
501 CPU
502 ROM
503 RAM
504 program
505 storage device
506 recording medium
507 drive device

508 communication interface
509 communication network
510 input/output interface
511 bus

What is claimed is:

1. A product detection device comprising:
a memory storing instructions; and
one or more processors configured to execute the instructions to:
acquire an image of a shelf on which a product is displayed;
binarize a region in the image into a product region in which the product appears and a non-product region in which a thing other than the product appears;
perform weighting on pixels of the product region and the non-product region based on their position in the image, wherein the weighting assigns higher weight values to pixels located at higher positions in a height direction of the shelf, which are located toward a rear of the shelf, compared to pixels located at lower positions in the height direction of the shelf, which are pixels located at a front of the shelf, in a display of the product; and
detect a state of display of the product displayed on the shelf according to a width of the product region that was subjected to the weighting and a width of a gap region adjacent to the product that was subjected to the weighting.

2. The product detection device according to claim 1, wherein
the one or more processors are further configured to execute the instructions to:
detect an anomaly of the display of the product when a ratio of the width of the gap region to the width of the product region is a predetermined value or more.

3. The product detection device according to claim 2, wherein
the one or more processors are further configured to execute the instructions to:
generate an approximate curve according to the width of the product region and the width of the gap region; and
detect the anomaly of the display of the product when at least part of the approximate curve falls below a second predetermined threshold value due to the ratio being equal to or more than the predetermined value.

4. The product detection device according to claim 1, wherein
the width of the product region includes the width of the product region associated with the product imaged from a plurality of angles.

5. The product detection device according to claim 1, wherein
the one or more processors are further configured to execute the instructions to:
store one or more models learned, for each shelf shape, for detecting the state of display of the product displayed on the shelf; and
perform the detection using the one or more stored models.

6. The product detection device according to claim 1, wherein
the one or more processors are further configured to execute the instructions to:
notify an external terminal of a result of the detection when detecting an anomaly in the display state of the product.

7. A product detection system comprising:
the product detection device according to claim 1;
a camera that captures the image to transmit the captured image to the product detection device; and
a terminal that receives a notification related to the detection from the product detection device.

8. A product detection method comprising:
acquiring an image of a shelf on which a product is displayed;
binarizing a region in the image into a product region in which the product appears and a non-product region in which a thing other than the product appears;
performing weighting on pixels of the product region and the non-product region based on their position in the image, wherein the weighting assigns higher weight values to pixels located at higher positions in a height direction of the shelf, which are located toward a rear of the shelf, compared to pixels located at lower positions in the height direction of the shelf, which are pixels located at a front of the shelf, in a display of the product; and
detecting a state of display of the product displayed on the shelf according to a width of the product region that was subjected to the weighting and a width of a gap region adjacent to the product that was subjected to the weighting.

9. The product detection method according to claim 8 wherein
the detecting includes detecting an anomaly of the display of the product when a ratio of the width of the gap region to the width of the product region is a predetermined value or more.

10. The product detection method according to claim 9, further comprising:
generating an approximate curve according to the width of the product region and the width of the gap region; and
detecting the anomaly of the display of the product when at least part of the approximate curve falls below a second predetermined threshold value due to the ratio being equal to or more than the predetermined value.

11. The product detection method according to claim 8, wherein
the width of the product region includes the width of the product region associated with the product imaged from a plurality of angles.

12. The product detection method according to claim 8, wherein
the detecting includes performing the detection using one or more stored models learned, for each shelf shape, for detecting the state of display of the product displayed on the shelf.

13. A recording medium storing a product detection program for causing a computer to execute:
acquiring an image of a shelf on which a product is displayed;
binarizing a region in the image into a product region in which the product appears and a non-product region in which a thing other than the product appears;
performing weighting on pixels of the product region and the non-product region based on their position in the image, wherein the weighting assigns higher weight values to pixels located at higher positions in a height direction of the shelf, which are located toward a rear of the shelf, compared to pixels located at lower positions in the height direction of the shelf, which are pixels located at a front of the shelf, in a display of the product; and detecting a state of display of the product displayed on the shelf according to a width of the product region that was subjected to the weighting and a width of a gap region adjacent to the product that was subjected to the weighting.

14. The recording medium according to claim 13, wherein the detecting includes detecting an anomaly of the display of the product when a ratio of the width of the gap region to the width of the product region is a predetermined value or more.

15. The recording medium according to claim 14, the executing further comprising:

generating an approximate curve according to the width of the product region and the width of the gap region; and detecting the anomaly of the display of the product when at least part of the approximate curve falls below a second predetermined threshold value due to the ratio being equal to or more than the predetermined value.

16. The recording medium according to claim 13, wherein the width of the product region includes the width of the product region associated with the product imaged from a plurality of angles.

17. The recording medium according to claim 13, wherein the detecting includes performing the detection using one or more stored models learned, for each shelf shape, for detecting the state of display of the product displayed on the shelf.

* * * * *